United States Patent
Yamaoka

(10) Patent No.: US 10,754,006 B2
(45) Date of Patent: Aug. 25, 2020

(54) SIGNAL PROCESSING DEVICE

(71) Applicant: Mitsubishi Electric Corporation, Chiyoda-ku (JP)

(72) Inventor: Tomoya Yamaoka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 590 days.

(21) Appl. No.: 15/504,853

(22) PCT Filed: Aug. 20, 2014

(86) PCT No.: PCT/JP2014/071759
§ 371 (c)(1),
(2) Date: Feb. 17, 2017

(87) PCT Pub. No.: WO2016/027326
PCT Pub. Date: Feb. 25, 2016

(65) Prior Publication Data
US 2017/0269193 A1    Sep. 21, 2017

(51) Int. Cl.
*G01S 7/292*    (2006.01)
*G01S 13/53*    (2006.01)
*G01S 13/90*    (2006.01)

(52) U.S. Cl.
CPC .............. *G01S 7/292* (2013.01); *G01S 13/53* (2013.01); *G01S 13/9029* (2013.01)

(58) Field of Classification Search
CPC .......... G01S 13/04; G01S 13/06; G01S 13/50; G01S 13/52; G01S 13/524;
(Continued)

(56) References Cited

U.S. PATENT DOCUMENTS 4,137,533 A  *  1/1979  Briechle ................... G01S 7/32
                                                342/162
4,628,318 A  * 12/1986  Alitz ..................... G01S 13/5242
                                                342/26 D
5,818,383 A  * 10/1998  Stockburger ............. G01S 3/46
                                                342/109

FOREIGN PATENT DOCUMENTS

CA    2827279 A1 *  4/2014
EP    2 725 382 A1    4/2014
(Continued)

OTHER PUBLICATIONS

Martina Gabele, Connparision of Techniques for Future Spaceborne GMTI, EUSAR 2010, ISBN 978-3-8007-3272-2 (Year: 2010).*

(Continued)

*Primary Examiner* — Erin F Heard
*Assistant Examiner* — Michael W Justice
(74) *Attorney, Agent, or Firm* — Oblon, McClelland, Maier & Neustadt, L.L.P.

(57) ABSTRACT

Disclosed is a signal processing device including a rearrangement unit 3 for rearranging the spectrum of a signal component outputted from a signal restoring unit 1 in such a way that a stationary target component and an aliasing component associated with a moving target, the stationary target component and the aliasing component being included in the signal component, and a moving target component included in the signal component are separate on a frequency domain, and a formation unit 4 for suppressing the stationary target component and the aliasing component associated with the moving target, the stationary target component and the aliasing component being included in the signal component whose spectrum is rearranged by the rearrangement unit 3, thereby extracting the moving target component included in the signal component after the spectrum rearrangement, in which a moving target image recon- (Continued)

structing unit 5 reconstructs an image of the moving target from the moving target component extracted by the formation unit 4.

17 Claims, 6 Drawing Sheets

(58) Field of Classification Search
CPC ............. G01S 13/5242; G01S 13/5244; G01S 13/5246; G01S 13/5248; G01S 13/53; G01S 13/9029; G01S 7/292
USPC .......................................................... 342/109
See application file for complete search history.

(56) References Cited

FOREIGN PATENT DOCUMENTS

| | | |
|---|---|---|
| JP | 2010-60448 A | 3/2010 |
| JP | 2013-181954 A | 9/2013 |

OTHER PUBLICATIONS

Extended Search Report dated Feb. 9, 2018 in European Patent Application No. 14900243.8.
Martina Gabele, et al., "Comparison of Techniques for Future Spaceborne GMTI", Electronic Proceedings/EUSAR 2010, Jun. 2010, XP055447013, pp. 386-389.
Office Action dated Oct. 10, 2017 in Canadian Patent Application No. 2,958,525.
International Search Report dated Oct. 21, 2014 in PCT/JP2014/071759 filed Aug. 20, 2014.
Krieger, Gerhard et al., "Unambiguous SAR Signal Reconstruction From Nonuniform Displaced Phase Center Sampling," IEEE Geoscience and Remote Sensing Letters, vol. 1, No. 4, Oct. 2004, pp. 260-264.
Livingstone, C.E. et al., "An airborne synthetic aperture radar (SAR) experiment to support RADARSAT-2 ground moving target indication (GMTI)," Can. J. Remote Sensing, vol. 28, No. 6, 2002, pp. 794-813.
Zhang, Shuang-Xi et al., "A Novel Moving Target Imaging Algorithm for HRWS SAR Based on Local Maximum-Likelihood Minimum Entropy," IEEE Transactions on Geoscience and Remote Sensing, vol. 52, No. 9, Sep. 2014, pp. 5333-5348.
Shu, Yuxiang et al., "Design Considerations of PRF for Optimizing GMTI Performance in Azimuth Multichannel SAR Systems with HRWS Imaging Capability," IEEE Transactions on Geoscience and Remote Sensing, vol. 52, No. 4, Apr. 2014, pp. 2048-2063.
Cumming, Ian G. et al., "Digital Processing of Synthetic Aperture Radar Data," Artech House Remote Sensing Library, 2005, 11 pages.
Jakowatz, Jr., Charles V. et al., "Spotlight-Mode Synthetic Aperture Radar: A Signal Processing Approach," Kluwer Academic Publishers, 1999, 8 pages.

* cited by examiner

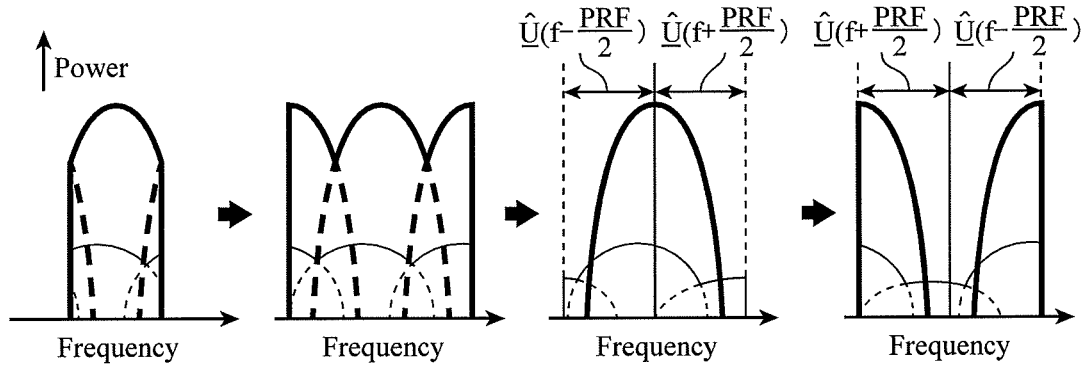
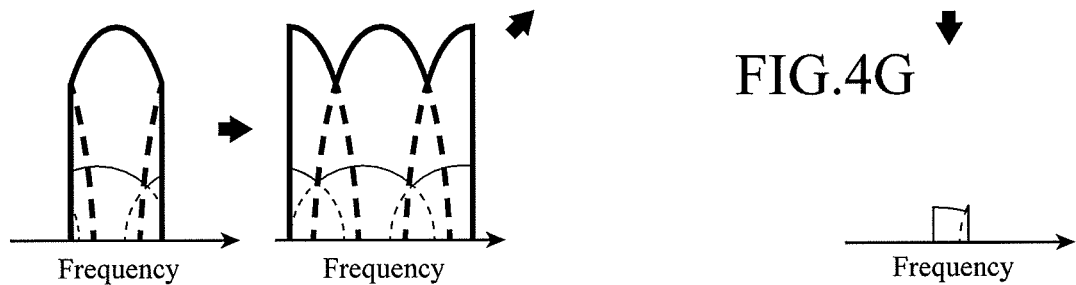
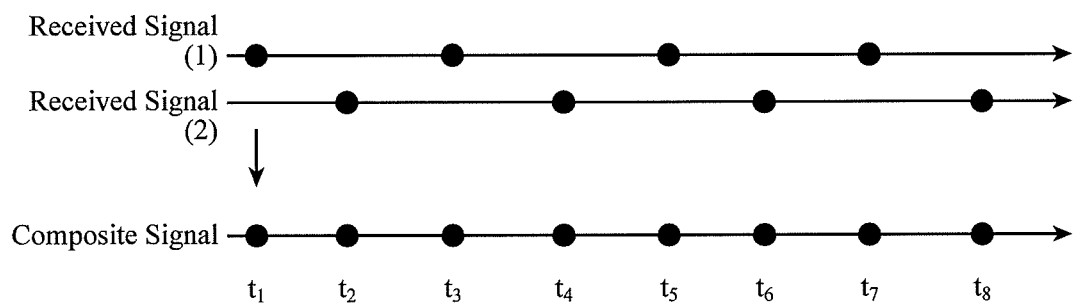
FIG. 5

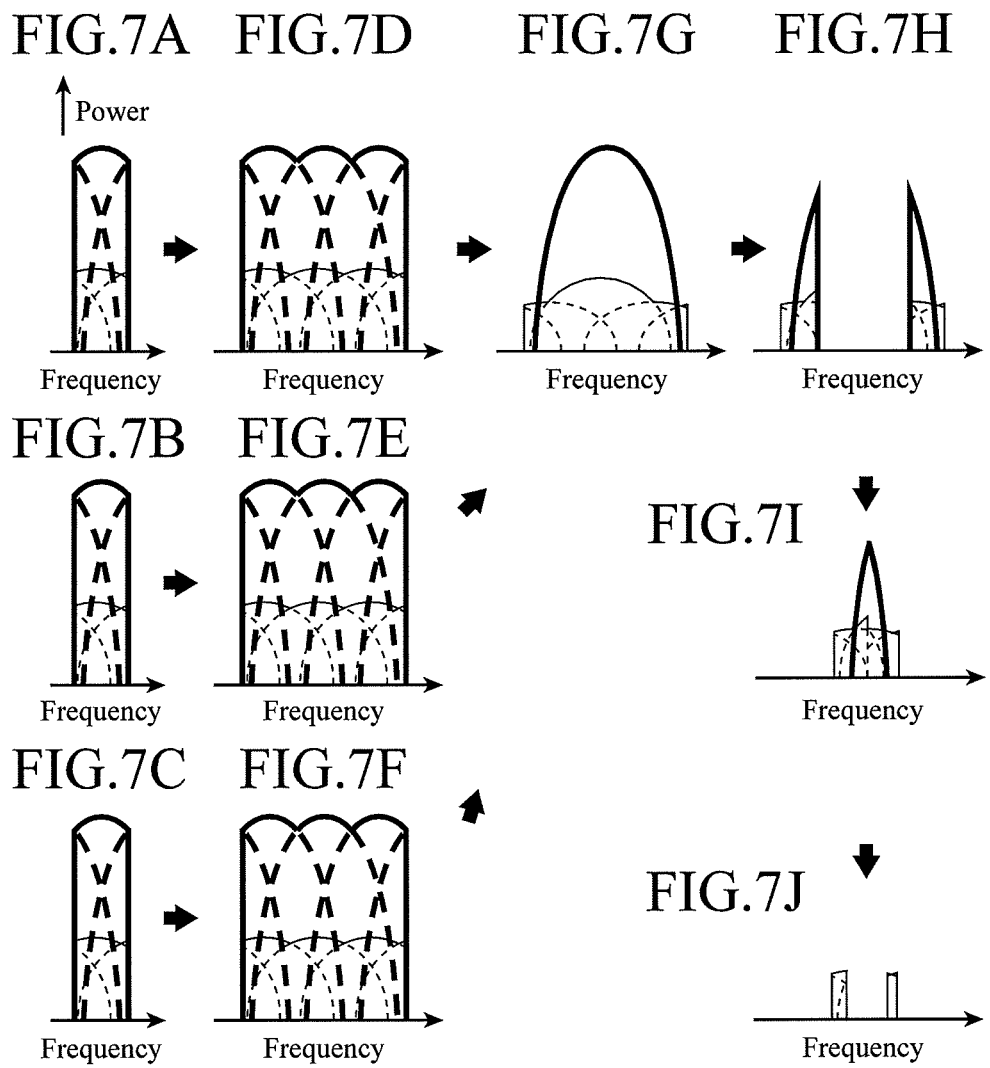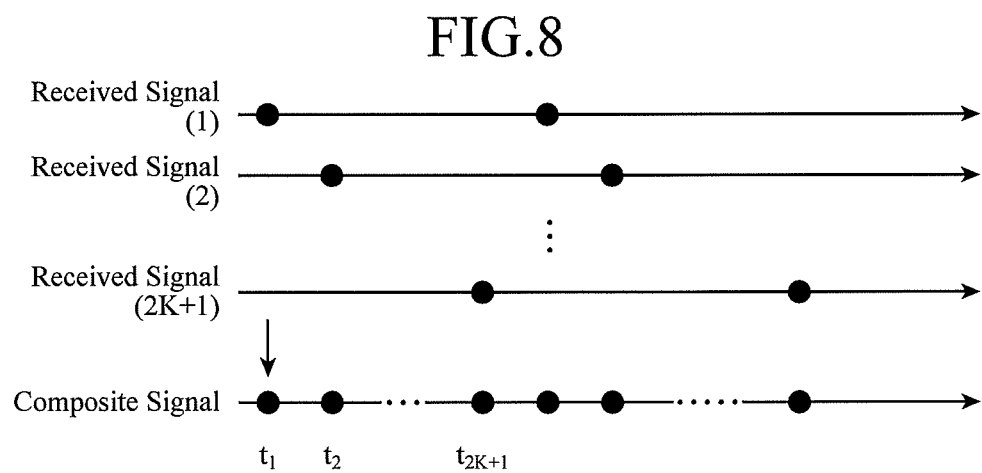

SIGNAL PROCESSING DEVICE

TECHNICAL FIELD

The present invention relates to a signal processing device that reconstructs an image of a moving target.

BACKGROUND ART

A multi-channel synthetic aperture radar has been proposed as means for achieving high functionality and high performance of a synthetic aperture radar.

In the case of a multi-channel synthetic aperture radar, if the number of transmitting antennas is one, it is necessary to use a plurality of reception antennas.

At this time, by disposing a plurality of reception antennas along the orbital direction of a platform in which a radar device is mounted, HRWS (High-Resolution Wide-Swath) disclosed by Nonpatent Literature 1 listed below can be implemented. HRWS means high resolution and a wide observation width which make it possible to assume that signals received via a plurality of channels are a received signal via a signal channel, and to separate azimuth ambiguity.

Further, MTI (Moving Target Indicator) disclosed by Nonpatent Literature 2 listed below can be implemented. MTI is a process for detecting a moving target by using correspondences between signals received via channels to remove clutter.

Studies to implement both HRWS and MTI are disclosed by Nonpatent Literatures 3 and 4, and show that when implementing HRWS, a combination of reception antennas with a low correlation among channels is desirable, whereas when implementing MTI, a combination of reception antennas with a high correlation among channels is desirable.

In order to implement both HRWS and MTI which should satisfy such conflicting requirements about a correlation among channels, it is necessary to increase the number of channels and to select a combination of reception antennas with a low correlation among channels and a combination of reception antennas with a high correlation among channels.

CITATION LIST

Non Patent Literatures

Non Patent Literature 1: G. Krieger, N. Gebert and A. Moreira, "Unambiguous SAR signal reconstruction from nonuniform displaced phase center sampling", IEEE Geoscience and Remote Sensing Letters, Vol. 1, No. 4, pp. 260-264, October, 2004.

Non Patent Literature 2: C. E. Livingstone, I. Sikaneta, C. H. Gierull, S. Chiu, A. Beaudoin, J. Campbell, J Beaudoin, S. Gong and T. A. Knight, "An airborne synthetic aperture radar (SAR) experiment to support RADARSAT-2 ground moving target identification (GMTI)", Can. J. Remote Sensing, Vol. 28, No. 6, pp. 794-813, 2002.

Non Patent Literature 3: Shuang-Xi Zhang, Meng-Dao Xing, Xiang-Gen Xia, Rui Guo, Yan-Yang Liu and Zheng Bao, "A novel moving target imaging algorithm for HRWS SAE SAR Based on Local Maximum Likelihood Minimum Entropy", IEEE Trans. on Geoscience and Remote Sensing, Vol. 52, No. 9, pp. 5333-5347, September, 2014. (to be published)

Non Patent Literature 4: Yuxiang Shu, Guisheng Liao and Zhiwei Yang, "Design considerations of PRF for optimizing GMTI performance in azimuth multichannel SAR systems with HRWS imaging capability", IEEE Trans. on Geoscience and Remote Sensing, Vol. 52, No. 4, pp. 2048-2063, April, 2014.

SUMMARY OF INVENTION

Technical Problem

The problem with the conventional signal processing devices configured as above is that although both HRWS and MTI which should satisfy conflicting requirements about a correlation among channels can be implemented if the number of channels is increased, the increase in the number of channels causes increase in the cost, the loadage, the amount of data transmitted, etc. at the time of mounting a conventional signal processing device in a satellite machine or the like.

The present invention is made in order to solve the above-mentioned problem, and it is therefore an object of the present invention to provide a signal processing device that can achieve high resolution and a wide observation width without increasing the number of channels, and that can also detect a moving target.

Solution to Problem

According to the present invention, there is provided a signal processing device including: a signal combiner to, when a plurality of reception antennas, the reception antennas being disposed along an orbital direction of a platform in which a radar device is mounted, receive signals which are included in signals repeatedly transmitted from a transmitting antenna and which are reflected by a stationary target or a moving target, combine the received signals of the plurality of reception antennas in such a way that aliasing noise components associated with the stationary target and included in the received signals of the plurality of reception antennas are canceled out, and output a composite signal; a moving target component extractor to suppress a stationary target component and an aliasing noise component associated with the moving target, the stationary target component and the aliasing noise component being included in the composite signal outputted from the signal combiner, and extracting a moving target component included in the composite signal; and an image reconstructing unit to reconstruct an image of the moving target from the moving target component extracted by the moving target component extractor. The signal combiner converts the received signals of said plurality of reception antennas into signals in a frequency domain, combines said plurality of signals in the frequency domain in such a way that aliasing noise components associated with said stationary target and included in said plurality of signals in the frequency domain are canceled out, and outputs the composite signal. The moving target component extractor includes: a rearrangement unit configured to arrange a spectrum of said composite signal in such a way that the stationary target component and the aliasing noise component associated with said moving target, the stationary target component and the aliasing noise component being included in the composite signal outputted from said signal combiner, and the moving target component included in said composite signal are separate on the frequency domain; and a formation unit configured to suppress the stationary target component and the aliasing noise component associated with said moving target, the stationary target component and the aliasing noise component being included in the composite signal whose spectrum is rearranged by said rearrangement unit, and configured to extract the moving target component included in said composite signal.

Advantageous Effects of Invention

Because the signal processing device according to the present invention is configured in such a way that the signal processing device includes the moving target component extracting means for suppressing the stationary target component and the aliasing noise component associated with the moving target, the stationary target component and the aliasing noise component being included in the composite signal outputted from the signal combining means, and extracting the moving target component included in the composite signal, and the image reconstructing means reconstructs an image of the moving target from the moving target component extracted by the moving target component extracting means, there is provided an advantage of being able to achieve high resolution and a wide observation width without increasing the number of channels, and to also detect a moving target.

BRIEF DESCRIPTION OF DRAWINGS

FIG. 4 is an explanatory drawing showing the waveforms of various signals on the frequency domain;

FIG. 5 is an explanatory drawing showing combining of received signals (1) and (2) on a time domain;

FIG. 7 is an explanatory drawing showing the waveforms of various signals on a frequency domain;

FIG. 8 is an explanatory drawing showing combining of received signals (1) to (2K+1) on a time domain;

DESCRIPTION OF EMBODIMENTS

Hereafter, the preferred embodiments of the present invention will be explained in detail with reference to the drawings.

Embodiment 1

In this Embodiment 1, an example of emitting pulse signals at a pulse repetition frequency PRF from a single transmitting antenna, and, after that, receiving pulse signals each reflected by a stationary target or a moving target by using two reception antennas disposed along the orbital direction of the moving target.

In this Embodiment 1, because one-half of the limit of the Doppler frequency shift range in which an aliasing component which is an aliasing noise component does not occur as azimuth ambiguity is used as the above-mentioned pulse repetition frequency PRF, azimuth ambiguity occurs as an aliasing component in a Doppler frequency signal component in each of the received signals of the two reception antennas.

Hereafter, the two reception antennas are referred to as the reception antenna ch1 and the reception antenna ch2.

Figure 1:
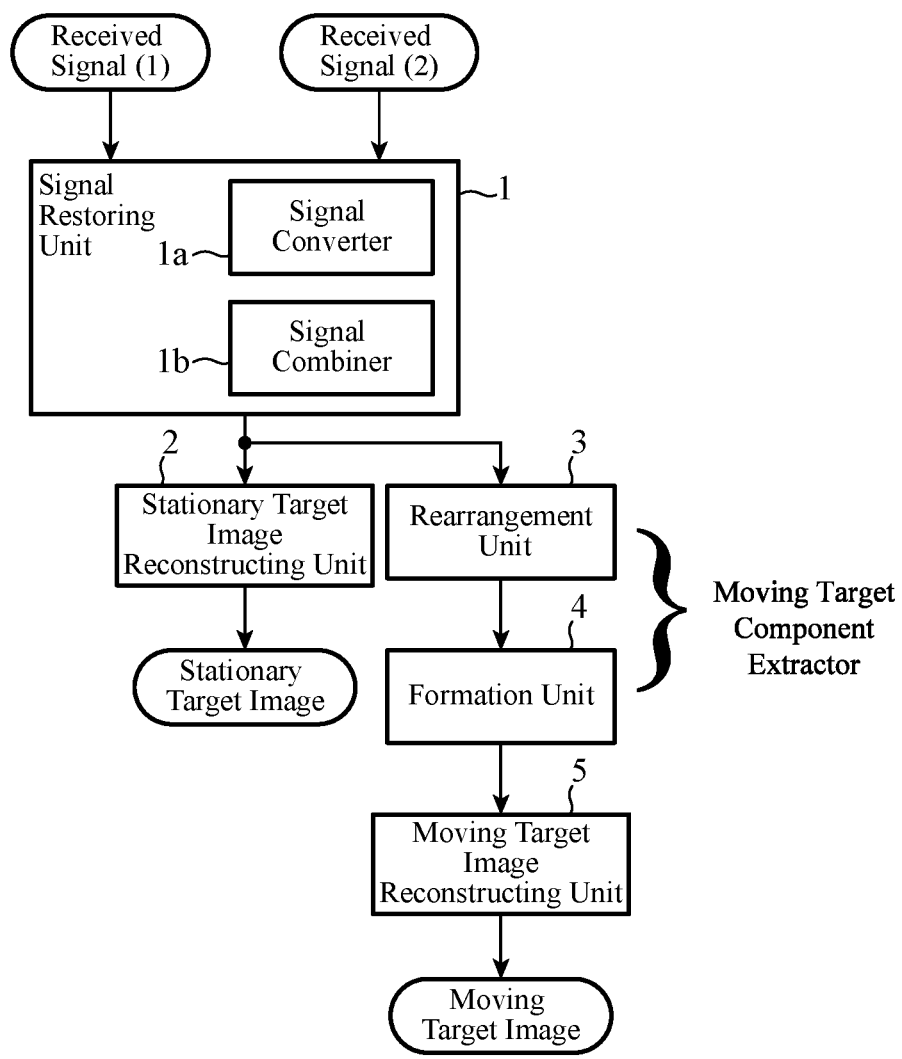
FIG. 1 is a structural diagram showing a signal processing device according to Embodiment 1 of the present invention.

FIG. 1 is a configuration diagram showing a signal processing device according to Embodiment 1 of the present invention.

In the configuration shown in FIG. 1, when receiving a received signal (1) from the reception antenna ch1, and also receiving a received signal (2) from the reception antenna ch2, a signal restoring unit 1 performs a process of combining the received signals (1) and (2) in such a way that the aliasing components associated with the stationary target and included in the received signals (1) and (2) are canceled out, and outputting a composite signal.

More specifically, the signal restoring unit 1 includes a signal converter 1a to convert the received signals (1) and (2) which are signals in a time domain into signals in a frequency domain, and to output the signals in the frequency domain as Doppler frequency signals (1) and (2), and a signal combiner 1b to cyclically shift the Doppler frequency signals (1) and (2) outputted from the signal converter 1a by one-half of the pulse repetition frequency PRF, to combine the Doppler frequency signals (1) and (2) after the cyclic shift in such a way that the aliasing components associated with the stationary target and included in the Doppler frequency signals (1) and (2) after the cyclic shift are canceled out, and to output a composite signal.

The signal restoring unit 1 constructs a signal combining means.

A stationary target image reconstructing unit 2 performs a process of reconstructing an image of the stationary target from a stationary target component included in the composite signal outputted from the signal restoring unit 1.

A rearrangement unit 3 rearranges the spectrum of the composite signal in such a way that the stationary target component and the aliasing component associated with the moving target, the stationary target component and the aliasing component being included in the composite signal outputted from the signal restoring unit 1, and a moving target component included in the composite signal are separate on the frequency domain.

A formation unit 4 performs a process of suppressing the stationary target component and the aliasing component associated with the moving target, the stationary target component and the aliasing component being included in the composite signal whose spectrum is rearranged by the rearrangement unit 3, and extracting the moving target component included in the composite signal.

A moving target component extracting means is comprised of the rearrangement unit 3 and the formation unit 4

A moving target image reconstructing unit 5 performs a process of reconstructing an image of the moving target from the moving target component extracted by the formation unit 4. An image reconstructing means is comprised of the stationary target image reconstructing unit 2 and the moving target image reconstructing unit 5.

In the example shown in FIG. 1, it is assumed that the signal restoring unit 1, the stationary target image reconstructing unit 2, the rearrangement unit 3, the formation unit 4 and the moving target image reconstructing unit 5, which are the components of the signal processing device, are comprised of pieces of hardware for exclusive use (e.g., semiconductor integrated circuits each equipped with a CPU, or one chip microcomputers). As an alternative, the signal processing device can be comprised of a computer.

In the case in which the signal processing device is comprised of a computer, a program in which processes performed by the signal restoring unit 1, the stationary target image reconstructing unit 2, the rearrangement unit 3, the formation unit 4 and the moving target image reconstructing unit 5 are described can be stored in a memory of the computer, and a CPU of the computer can be made to execute the program stored in the memory.

Figure 2:
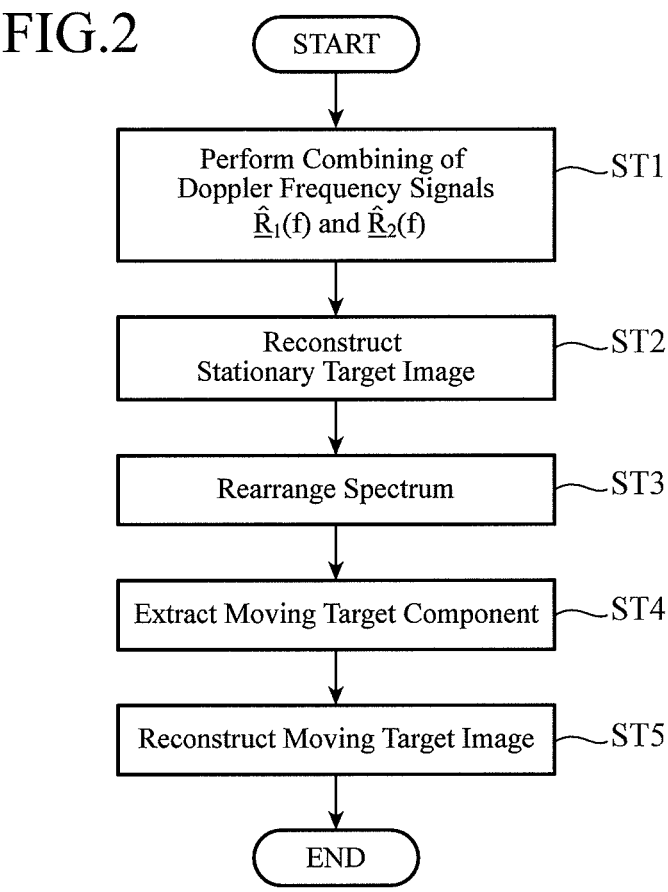
FIG. 2 is a flow chart showing the details of processing performed by the signal processing device according to Embodiment 1 of the present invention.

FIG. 2 is a flow chart showing the details of processing performed by the signal processing device according to Embodiment 1 of the present invention.

Next, operations will be explained.

Before the details of the processing performed by the signal processing device is explained concretely, the formulization of received signals when observing a stationary target and a moving target is explained. First, a case in which only a stationary target is observed, but no moving target is observed is explained.

Hereafter, it is assumed that the transmitting antenna and the reception antennas ch1 and ch2 are disposed along the orbital direction of the moving target, and the reception antenna ch1 is disposed at a position a distance $\Delta x_1$ away from the transmitting antenna and the reception antenna ch2 is disposed at a position a distance $\Delta x_2$ away from the transmitting antenna.

Pulse signals which are included in the pulse signals emitted at the pulse repetition frequency PRF from the transmitting antenna, and which are reflected by the stationary target are received by the reception antennas ch1 and ch2. The propagation distance $r_i(t)$ of each pulse signal is expressed by the following equation (1). In this equation, i=1 and 2.

$$r_i(t) = \sqrt{r_0^2 + (v_{plf}t)^2} + \sqrt{r_0^2 + (v_{plf}t + \Delta x_i)^2} \quad (1)$$

In the equation (1), $r_0$ denotes the slant range distance which is the distance from the transmitting antenna to the stationary target, and $v_{plf}$ denotes the moving speed of a platform in which a radar device is mounted.

The propagation distance $r_i(t)$ of each pulse signal expressed by the equation (1) can be simplified to the following equation (2) when a Taylor approximation is introduced into the equation (1).

$$r_i(t) = 2r_0 + \frac{(v_{plf}t)^2}{2r_0} + \frac{(v_{plf}t + \Delta x_i)^2}{2r_0} \quad (2)$$

$$= 2r_0 + \frac{v_{plf}\left(t + \frac{\Delta x_i^2}{2v_{plf}}\right)}{r_0} + \frac{\Delta x_i^2}{4r_0}$$

Therefore, the Doppler frequency signals $S_i(f)$ which are the Doppler frequency components of the received signals (1) and (2) of the reception antennas ch1 and ch2 are expressed as signals in each of which a phase rotation corresponding to a time shift of $-\Delta x_i/2v_{plf}$ and a distance change of $\Delta x_i^2/4r_0$ is provided for $U(f)$ which is the Doppler frequency component of each of the received signals at a time when normal mono-static observations are carried out, as shown in the following equation (3).

$$S_i(f) = G_i(f)U(f) \quad (3)$$

-continued
$$G_i(f) = \exp\left(-j\pi \frac{f_c \Delta x_i^2}{2cr_0}\right)\exp\left(-j2\pi \frac{\Delta x_i}{2v_{plf}}f\right)$$

Because these Doppler frequency signals $S_i(f)$ are band-limited by the pulse repetition frequency PRF, the reception antennas ch1 and ch2 actually receive Doppler frequency signals $S_i(f)$ in each of which aliasing occurs. Hereafter, the Doppler frequency signals in each of which aliasing occurs are denoted by $\underline{s}_i(f)$.

FIG. 3 is an explanatory drawing showing the waveforms of various signals on the frequency domain.

Figure 3A:
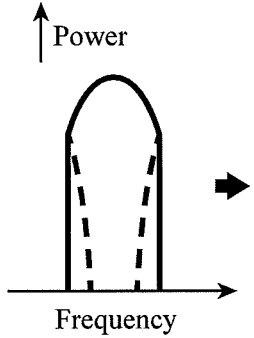
FIG. 3 is an explanatory drawing showing the waveforms of various signals on a frequency domain.
Figure 3C:
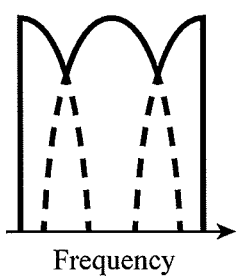
Figure 3E:
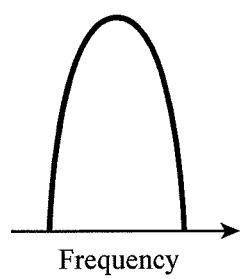
Figure 3B:
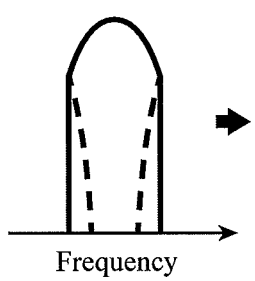

FIG. 3A shows the Doppler frequency signal $\underline{s}_1(f)$ received by the reception antenna ch1, and FIG. 3B shows the Doppler frequency signal $\underline{s}_2(f)$ received by the reception antenna ch2. In FIG. 3, a solid line shows a stationary target component and a broken line shows an aliasing component associated with the stationary target.

Figure 3D:
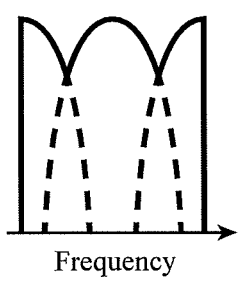

When the Doppler frequency signals $\underline{s}_i(f)$ are cyclically shifted by PRF/2 in order to perform matching with the center frequency of the composite signal which includes the stationary target component and which is a broadband signal, the Doppler frequency signals become ones as shown in FIGS. 3C and 3D. Hereafter, the Doppler frequency signals after the cyclic shift are denoted by $\underline{S}_i(f)$.

The signal combiner performs the process, as shown in the following equation (4), of combining the Doppler frequency signal $\underline{S}_1(f)$ after the cyclic shift and the Doppler frequency signal $\underline{S}_2(f)$ after the cyclic shift, in such a way that the aliasing components associated with the stationary target and included in the Doppler frequency signals $\underline{S}_i(f)$ after the cyclic shift are canceled out. By performing this combining process, a signal component U-hat(f) as shown in FIG. 3E is acquired as the stationary target component. Because in this specification the symbol of "^" cannot be attached to the top of any character from the restrictions on electronic applications, such a signal component is denoted by U-hat(f).

The signal component U-hat(f) which is the composite signal is a wide band signal in which the aliasing components are canceled out, and which is equivalent to a signal acquired by carrying out a mono-static observation.

$$\begin{bmatrix} \hat{U}\left(f - \frac{PRF}{2}\right) \\ \hat{U}\left(f + \frac{PRF}{2}\right) \end{bmatrix} = \begin{bmatrix} G_1\left(f - \frac{PRF}{2}\right) & G_2\left(\frac{f-}{PRF}{2}\right) \\ G_1\left(f + \frac{PRF}{2}\right) & G_2\left(\frac{f+}{PRF}{2}\right) \end{bmatrix}^{-1} \begin{bmatrix} \underline{S}_1(f) \\ \underline{S}_2(f) \end{bmatrix} \quad (4)$$

$$= \begin{bmatrix} H_{11}(f) & H_{21}\left(f - \frac{PRF}{2}\right) \\ H_{12}(f) & H_{22}\left(f + \frac{PRF}{2}\right) \end{bmatrix} \begin{bmatrix} \underline{S}_1(f) \\ \underline{S}_2(f) \end{bmatrix}$$

Next, the formulization of received signals when observing a moving target is explained.

The present invention focuses attention on the fact that when a moving target is observed, the aliasing component associated with the moving target remains even if the combining process expressed by the above-mentioned equation (4) is performed.

First, when pulse signals which are included in the pulse signals emitted at the pulse repetition frequency PRF from the transmitting antenna, and each of which is reflected by a stationary target or a moving target are received by the reception antennas ch1 and ch2, the propagation distance $r_i(t)$ of each pulse signal is expressed by the following equation (5). In this equation, i=1 and 2.

$$r_i(t)=\sqrt{(r_0+v_{tgt}t)^2+(v_{plf}t)^2}+\sqrt{(r_0+v_{tgt}t)^2+(v_{plf}t-\Delta x_i)^2} \quad (5)$$

In the equation (5), $v_{tgt}$ denotes the moving speed in a range direction of the moving target. In this Embodiment 1, it is assumed that the moving target is not moving in an azimuth direction.

The propagation distance $r_i(t)$ of each pulse signal expressed by the equation (5) can be simplified to the following equation (6) when a Taylor approximation is introduced into the equation (5).

$$\begin{aligned}r_i(t) &= 2r_0 + 2v_{tgt}t + \frac{(v_{plf}t)^2}{2r_0} + \frac{(v_{plf}t-\Delta x_i)^2}{2r_0} \\ &= 2r_0 + \frac{v_{plf}\left(t+\frac{\Delta x_i}{2v_{plf}}+\frac{r_0 v_{tgt}}{v_{plf}^2}\right)^2}{r_0} + \frac{\Delta x_i^2}{4r_0} - \\ &\quad \frac{v_{tgt}\Delta x_i}{v_{plf}} - \frac{v_{plf}^2 r_0}{v_{plf}^2}\end{aligned} \quad (6)$$

Therefore, the Doppler frequency signals $R_i(f)$ which is the Doppler frequency components of the received signals (1) and (2) of the reception antennas ch1 and ch2 are expressed as signals in each of which a phase rotation corresponding to a time shift of $-\Delta x_i/2v_{plf}$, a time shift of $-r_0 v_{tgt}/v_{plf}^2$ and a distance change of $\Delta x_i^2/4r_0 - v_{tgt}\Delta x_i/v_{plf} - v_{tgt}^2 r_0/v_{plf}^2$ is provided for U(f) which is the Doppler frequency component of each of the received signals at a time when normal mono-static observations are carried out, as shown in the following equation (7).

$$G_i(f) = G_i(f)U(f)\varphi_i\varphi_\Delta\varphi_D(f) \quad (7)$$
$$= S_i(f)\varphi_i\varphi_\Delta\varphi_D(f)$$

$$G_i(f) = \exp\left(-j\pi\frac{f_c\Delta x_i^2}{2cr_0}\right)\exp\left(-j2\pi\frac{\Delta x_i}{2v_{plf}}f\right)$$

$$\varphi_i = \exp\left(j2\pi\frac{f_c v_{tgt}}{c}\frac{\Delta x_i}{v_{plf}}\right)$$

$$\varphi_\Delta = \exp\left(j2\pi\frac{f_c}{c}\frac{v_{tgt}^2 r_0}{v_{plf}^2}\right)$$

$$\varphi_D(f) = \exp\left(-j2\pi\frac{v_{tgt}r_0}{v_{plf}^2}f\right)$$

Because these Doppler frequency signals $R_i(f)$ are band-limited by the pulse repetition frequency PRF, the reception antennas ch1 and ch2 actually receive Doppler frequency signals $R_i(f)$ in each of which aliasing occurs. Hereafter, the Doppler frequency signals in each of which aliasing occurs are denoted by $\underline{R}_i(f)$.

FIG. 4 is an explanatory drawing showing the waveforms of various signals on the frequency domain.

FIG. 4A shows the Doppler frequency signal $\underline{R}_1(f)$ received by the reception antenna ch1, and FIG. 4B shows the Doppler frequency signal $\underline{R}_2(f)$ received by the reception antenna ch2.

In FIG. 4, a thick line shows the stationary target component and a thin line shows the moving target component. Further, this figure shows that broken lines make it possible to recognize a situation in which a desired signal and aliasing overlap each other.

When the Doppler frequency signals $\underline{R}_i(f)$ are cyclically shifted by PRF/2 to further broaden the band, in order to perform matching with the center frequency of the composite signal which includes the stationary target component and the moving target component and which is a broadband signal, the Doppler frequency signals become ones as shown in FIGS. 4C and 4D. Hereafter, the Doppler frequency signals after the cyclic shift are denoted by $\underline{R}_i(f)$.

The signal combiner performs the process, as shown in the following equation (8), of combining the Doppler frequency signal $\underline{R}_1(f)$ after the cyclic shift and the Doppler frequency signal $\underline{R}_2(f)$ after the cyclic shift, in such a way that the aliasing components associated with the stationary target and included in the Doppler frequency signals $\underline{R}_i(f)$ after the cyclic shift are canceled out. By performing this combining process, a composite signal having a waveform as shown in FIG. 4E is acquired.

$$\begin{aligned}\begin{bmatrix}\hat{U}\left(f-\frac{PRF}{2}\right)\\ \hat{U}\left(f+\frac{PRF}{2}\right)\end{bmatrix} &= \begin{bmatrix}G_1\left(f-\frac{PRF}{2}\right) & G_2\left(\frac{f-\frac{PRF}{2}}{2}\right)\\ G_1\left(f+\frac{PRF}{2}\right) & G_2\left(\frac{f+\frac{PRF}{2}}{2}\right)\end{bmatrix}^{-1}\begin{bmatrix}R_1(f)\\ R_2(f)\end{bmatrix}\\ &= \begin{bmatrix}H_{11}(f) & H_{21}\left(f-\frac{PRF}{2}\right)\\ H_{12}(f) & H_{22}\left(f+\frac{PRF}{2}\right)\end{bmatrix}\begin{bmatrix}S_1(f)\\ S_2(f)\end{bmatrix}\end{aligned} \quad (8)$$

$$\varphi_i\varphi_\Delta\varphi_D(f)$$

By performing the combining process expressed by the equation (8), the aliasing components are canceled out and a signal component $\hat{Z}_i(f)$ as shown in the following equation (9) is acquired.

$$\hat{Z}_1(f)=H_{11}(f)\underline{S}_1(f)+H_{12}(f)\underline{S}_2(f)$$

$$\hat{Z}_2(f)=H_{21}(f)\underline{S}_1(f)+H_{22}(f)\underline{S}_2(f) \quad (9)$$

However, in the combining process expressed by the equation (8), an aliasing component $\hat{V}_i(f)$ as shown in the following equation (10) remains.

$$\hat{V}_1(f)=H_{11}(f)\underline{S}_1(f)-H_{12}(f)\underline{S}_2(f)$$

$$\hat{V}_1(f)=H_{11}(f)\underline{S}_1(f)-H_{12}(f)\underline{S}_2(f) \quad (10)$$

It is seen from division of U-hat (f) shown in the equation (8) into $Z_i$-hat (f) and $V_i$-hat (f), an aliasing component remains in accordance with the remaining amount of $V_i$-hat (f).

By arranging the combining process expressed by the equation (8), the combining process can be expressed as shown in the following equation (11).

$$\begin{bmatrix} \hat{U}\left(f - \frac{PRF}{2}\right) \\ \hat{U}\left(f + \frac{PRF}{2}\right) \end{bmatrix} = \begin{bmatrix} G_1\left(f - \frac{PRF}{2}\right) & G_2\left(\frac{f-\frac{PRF}{2}}{2}\right) \\ G_1\left(f + \frac{PRF}{2}\right) & G_2\left(\frac{f+\frac{PRF}{2}}{2}\right) \end{bmatrix}^{-1} \begin{bmatrix} R_1(f) \\ R_2(f) \end{bmatrix} \quad (11)$$

$$= \begin{bmatrix} H_{11}(f) & H_{21}\left(f - \frac{PRF}{2}\right) \\ H_{12}(f) & H_{22}\left(f + \frac{PRF}{2}\right) \end{bmatrix} \begin{bmatrix} \underline{S}_1(f) \\ \underline{S}_2(f) \end{bmatrix}$$

$$\varphi_i \varphi_\Delta \varphi_D(f)$$

$$= \begin{bmatrix} \hat{Z}_1(f)\cos\theta_- + j\hat{V}_1(f)\sin\theta_- \\ \hat{Z}_2(f)\cos\theta_- + j\hat{V}_2(f)\sin\theta_- \end{bmatrix}$$

$$\exp(j\theta_+)\varphi_i \varphi_\Delta \varphi_D(f)$$

$$\theta_+ = \arg\left(\sqrt{\varphi_1 \varphi_2}\right)$$

$$\theta_- = \arg\left(\sqrt{\frac{\varphi_1}{\varphi_2}}\right)$$

It is seen from $V_i$-hat(f) being multiplied by a coefficient of $\sin\theta_-$ in the equation (11) that there remains an aliasing component associated with the moving target and corresponding to a coefficient in which the speed of the moving target and the gap between the reception antennas are reflected.

Therefore, the signal processing device according to this Embodiment 1 reconstructs an image in which the moving target component is emphasized, while, in such a way that the aliasing component of the moving target component in a band in which the stationary target component is small in amount is imaged, suppressing the stationary target component outside the band.

Hereafter, the details of the processing performed by the signal processing device are explained concretely.

When the reception antennas ch1 and ch2 receive pulse signals which are included in the pulse signals emitted at the pulse repetition frequency PRF from the transmitting antenna and each of which is reflected by a stationary target or a moving target, the signal restoring unit 1 acquires the received signals (1) and (2) of the reception antennas ch1 and ch2.

When acquiring the received signals (1) and (2) of the reception antennas ch1 and ch2, the signal converter 1a of the signal restoring unit 1 converts the received signals (1) and (2) into signals in the frequency domain, and outputs the signals in the frequency domain as Doppler frequency signals (1) and (2).

As described above, these Doppler frequency signals (1) and (2) are Doppler frequency signals in each of which aliasing occurs, and these Doppler frequency signals are denoted by $\underline{R}_i(f)$ hereafter. In $\underline{R}_i(f)$, i=1 and 2.

It doesn't matter how to convert the received signals (1) and (2) which are signals in the time domain into signals in the frequency domain. For example, by performing a fast Fourier transform process or a discrete Fourier transform process on the received signals (1) and (2), the received signals (1) and (2) can be converted into signals in the frequency domain.

When receiving the Doppler frequency signals $\underline{R}_i(f)$ from the signal converter 1a, the signal combiner 1b of the signal restoring unit 1 cyclically shifts each of the Doppler frequency signals $\underline{R}_i(f)$ by PRF/2, as shown in FIGS. 4C and 4D, in order to perform matching with the center frequency of the composite signal which includes a stationary target component and a moving target component and which is a broadband signal.

After cyclically shifting each of the Doppler frequency signals $\underline{R}_i(f)$ by PRF/2, the signal combiner 1b combines the Doppler frequency signal $\underline{R}_1(f)$ after the cyclic shift and the Doppler frequency signal $\underline{R}_2(f)$ after the cyclic shift in such a way that the aliasing components associated with the stationary target and included in the Doppler frequency signals $\underline{R}_i(f)$ after the cyclic shift are canceled out, and outputs a composite signal as shown in FIG. 4E to the stationary target image reconstructing unit 2 and the rearrangement unit 3.

More specifically, the signal combiner 1b performs the combining process expressed by the equation (8), thereby acquiring signal components U-hat (f−PRF/2) and U-hat(f+PRF/2) as the composite signal, and outputs the signal components U-hat(f−PRF/2) and U-hat(f+PRF/2) to the stationary target image reconstructing unit 2 and the rearrangement unit 3 (in step ST1 of FIG. 2).

When receiving the signal components U-hat(f−PRF/2) and U-hat(f+PRF/2) from the signal restoring unit 1, the stationary target image reconstructing unit 2 converts the signal components U-hat(f−PRF/2) and U-hat(f+PRF/2) into signals in the time domain, and reconstructs an image of the stationary target from the signals in the time domain (in step ST2).

It doesn't matter how to convert the signal components U-hat(f−PRF/2) and U-hat(f+PRF/2) into signals in the time domain. For example, by performing an inverse fast Fourier transform process or an inverse discrete Fourier transform process on the signal components U-hat(f−PRF/2) and U-hat (f+PRF/2), the signal components can be converted into signals in the time domain.

A method of reconstructing a stationary target image is disclosed by, for example, following Nonpatent Literatures 5 and 6. For example, a range Doppler method, a chirp scaling method, an ω-K method, a polar format method, a back projection method, or the like can be used.

Non Patent Literature 5: Lan G. Cumming and Frank H. Wong, "digital processing of SYNTHETIC APERTURE RADAR", ARTECH HOUSE Non Patent Literature 6: Gharles V. Jakowatz Jr., Daniel E. Wahl, Palu H. Eichel, Dennis C. Ghiglia and Paul A. Thompson, "SPOTLIGHT-MODE SYNTHETIC APERTURE RADAR: A SIGNAL PROCESSING APPROACH", KLUWER ACADEMIC PUBLISHERS When receiving the signal components U-hat(f−PRF/2) and U-hat(f+PRF/2) from the signal restoring unit 1, the rearrangement unit 3 rearranges the spectra of the signal components U-hat(f−PRF/2) and _U-hat(f+PRF/2) in such a way that the stationary target component and the aliasing component associated with the moving target, the stationary target component and the aliasing component being included in each of the signal components U-hat(f−PRF/2) and U-hat (f+PRF/2), and the moving target component included in each of the signal components U-hat(f−PRF/2) and U-hat (f+PRF/2) are separate on the frequency domain, as shown in FIG. 4F (in step ST3).

More specifically, the rearrangement unit 3 rearranges the spectra of the signal components U-hat(f−PRF/2) and U-hat (f+PRF/2), as shown in the following equation (12), where, in order to add the moving target components coherently, the conversion of the sign is also carried out.

$$\hat{\underline{U}}\left(f - \frac{PRF}{2}\right) = \hat{U}\left(f + \frac{PRF}{2}\right) \qquad (12)$$

$$\hat{\underline{U}}\left(f + \frac{PRF}{2}\right) = -\hat{U}\left(f - \frac{PRF}{2}\right)$$

$$-\frac{PRF}{2} \leq f < \frac{PRF}{2}$$

After the rearrangement unit 3 rearranges the spectra of the signal components U-hat(f−PRF/2) and U-hat(f+PRF/2), the formation unit 4 suppresses the stationary target component and the aliasing component associated with the moving target, the stationary target component and the aliasing component being included in each of the signal components U-hat(f−PRF/2) and U-hat(f+PRF/2) after the spectrum rearrangement, and extracts the moving target component included in each of the signal components U-hat(f−PRF/2) and U-hat(f+PRF/2) after the spectrum rearrangement, as shown in FIG. 4G (in step ST4).

More specifically, the formation unit 4 removes frequency components in each of which a stationary target component remains (in the example of FIG. 4F, low-frequency and high-frequency components except frequency components in a center frequency band), from the signal component U-hat(f) having a bandwidth of −PRF≤f<PRF, thereby extracting the moving target component existing in the center frequency band. In the example of FIG. 4F, while the aliasing component associated with the moving target remains, in a small amount, in the center frequency band, the major component in the center frequency band is the moving target component.

In this embodiment, the formation unit 4 performs the spectrum arranging process of removing the frequency components in each of which a stationary target component remains from the signal component U-hat(f) having a bandwidth of −PRF≤f<PRF. As an alternative, the formation unit 4 can average the electric power of the signal component U-hat(f) in a range direction, and whiten the stationary target component by using a weight W-hat(f) which the formation unit acquires by calculating the square root of the averaged result and then calculating the reciprocal of the square root.

Further, because by using the weight W-hat(f) twice, a matched filter can be configured, and the power ratio of signal to stationary target can be maximized, the spectrum arrangement of the signal component U-hat(f) can be carried out by using the matched filter.

Further, when the speed component of the moving target to be observed is predetermined, the moving target component can be extracted from the signal component U-hat(f) by taking into consideration the shift amount corresponding to the Doppler shift.

Further, a filter bank can be configured by combining filters designed for Doppler shifts, and a plurality of signal components each including a moving speed can be outputted. Further, these methods can be combined.

Further, by setting the bandwidth to −PRF/4≤f<PRF/4, the rearrangement unit 3 can arrange the spectra as follows.

$$\hat{\underline{U}}\left(f - \frac{3PRF}{4}\right) = -\hat{U}\left(f - \frac{3PRF}{4}\right) \qquad (12)\text{-}2$$

$$\hat{\underline{U}}\left(f - \frac{PRF}{4}\right) = \hat{U}\left(f + \frac{3PRF}{4}\right)$$

$$\hat{\underline{U}}\left(f + \frac{PRF}{4}\right) = -\hat{U}\left(f - \frac{3PRF}{4}\right)$$

$$\hat{\underline{U}}\left(f + \frac{3PRF}{4}\right) = -\hat{U}\left(f + \frac{3PRF}{4}\right)$$

By thus adding, in the normal restoring process, a moving target component Doppler-shifted toward a range, outside the band, in which the existing amount of clutter is small, the signal to clutter ratio can be improved. This process is achieved by making a copy of a signal and performing replacement in the rearrangement unit 3. For example, by making a copy of a signal and performing replacement, as mentioned above, the signal to clutter ratio can be further improved.

Also on this signal component, the process of suppressing the stationary target component and the aliasing component associated with the moving target can be performed and the weight Ŵ(f) described previously can be placed once or twice. Further, also in this spectrum arrangement, when the speed component of the moving target to be observed is predetermined, the signal component can be extracted from Û(f) by taking into consideration the shift amount corresponding to the Doppler shift. Further, a filter bank can be configured by combining filters designed for Doppler shifts, and a plurality of signal components each including a moving speed can be outputted.

After the formation unit 4 extracts the moving target component, the moving target image reconstructing unit 5 converts the moving target component into a signal in the time domain, and reconstructs an image of the moving target from the signal in the time domain (in step ST5).

It doesn't matter how to convert the moving target component which is a signal in the frequency domain into a signal in the time domain. For example, by performing an inverse fast Fourier transform process or an inverse discrete Fourier transform process on the moving target component, the moving target component can be converted into a signal in the time domain.

Further, it doesn't matter how to reconstruct a moving target image. For example, a range Doppler method, a chirp scaling method, an ω-K method, a polar format method, a back projection method, or the like can be used.

After reconstructing an image of the moving target, the moving target image reconstructing unit 5 detects one or more pixels each having a larger amplitude value (signal strength) than a preset threshold from among the pixels which construct the image of the moving target, and determines the group of the one or more pixels detected as the moving target.

This threshold can be determined from, for example, the signal strength associated with the moving target and the signal strength associated with the surroundings of the moving target.

Further, by performing a filtering process of detecting an edge or the like on the pixels which construct the moving target image, using an edge detection filter or a filter equivalent to this edge detection filter, the moving target image reconstructing unit can suppress remaining clutters and azimuth ambiguity. At this time, when an edge detection filter is used for the signal amplitude, the moving target image reconstructing unit cam replace each negative output with 0.

Further, after reconstructing an image of the moving target, the moving target image reconstructing unit 5 can apply different colors to the image of the moving target and the image of the stationary target reconstructed by the stationary target image reconstructing unit 2, to adjust the dynamic range, and, after that, superimpose the image of the moving target and the image of the stationary target on each other.

By thus superimposing the image of the moving target and the image of the stationary target on each other, visual recognition of the images superimposed on each other can be carried out.

The process of reconstructing the image of the moving target, which is performed by the moving target image reconstructing unit 5, and the process of reconstructing the image of the stationary target, which is performed by the stationary target image reconstructing unit 2, can be performed in parallel.

As can be seen from the above description, because the signal processing device according to Embodiment 1 is configured in such a way that the signal processing device includes the rearrangement unit 3 to rearrange the spectra of the signal components U-hat(f−PRF/2) and U-hat(f+PRF/2) outputted from the signal restoring unit 1 in such a way that the stationary target component and the aliasing component associated with the moving target, the stationary target component and the aliasing component being included in each of the signal components U-hat(f−PRF/2) and U-hat (f+PRF/2), and the moving target component included in each of the signal components U-hat(f−PRF/2) and U-hat (f+PRF/2) are separate on the frequency domain, and the formation unit 4 to suppress the stationary target component and the aliasing component associated with the moving target, the stationary target component and the aliasing component being included in each of the signal components U-hat(f−PRF/2) and U-hat(f+PRF/2) after the spectrum rearrangement by the rearrangement unit 3, and to extract the moving target component included in each of the signal components U-hat(f−PRF/2) and U-hat(f+PRF/2) after the spectrum rearrangement, and the moving target image reconstructing unit 5 reconstructs an image of the moving target from the moving target components extracted by the formation unit 4, there is provided an advantage of being able to achieve high resolution and a wide observation width without increasing the number of channels, and to also detect a moving target.

More specifically, by simply using the two reception antennas ch1 and ch2, an improvement of the resolution, an increase of the observation width, and detection of a moving target can be implemented.

In this Embodiment 1, the example in which the rearrangement unit 3 rearranges the spectra of the signal components U-hat(f−PRF/2) and U-hat(f+PRF/2) in such a way that the stationary target component and the aliasing component associated with the moving target, and the moving target component are separate on the frequency domain, and the formation unit 4 suppresses the stationary target component and the aliasing component associated with the moving target, the stationary target component and the aliasing component being included in each of the signal components U-hat(f−PRF/2) and U-hat(f+PRF/2) after the spectrum rearrangement, and extracts the moving target component included in each of the signal components U-hat(f−PRF/2) and U-hat(f+PRF/2) after the spectrum rearrangement is shown.

However, this configuration is only an example, and the stationary target component and the aliasing component associated with the moving target can be suppressed and the moving target component can be extracted without rearranging the spectra.

Concretely, the moving target image reconstructing unit 5 performs a range cell migration process and a matched filter process for azimuth compression on the signal components U-hat(f−PRF/2) and U-hat(f+PRF/2) outputted from the signal restoring unit 1 in such a way that the stationary target component and the moving target component which are included in each of the signal components U-hat(f−PRF/2) and U-hat(f+PRF/2) are suppressed, and the aliasing component of the moving target component is imaged as a desired signal, thereby extracting the moving target component included in each of the signal components U-hat(f−PRF/2) and U-hat(f+PRF/2). Because the range cell migration process and the matched filter process for azimuth compression are known techniques, a detailed explanation of the processes will be omitted hereafter. In this case, the moving target image reconstructing unit 5 constructs a moving target component extracting means.

In this Embodiment 1, the example in which the signal converter 1a of the signal restoring unit 1 converts the received signals (1) and (2) of the reception antennas ch1 and ch2 into signals in the frequency domain, and the signal combiner 1b cyclically shifts each of the Doppler frequency signals $R_i(f)$ which are the signals in the frequency domain by PRF/2, and, after that, combines the Doppler frequency signals $R_1(f)$ and $R_2(f)$ after the cyclic shift in such a way that the aliasing components associated with the stationary target and included in the Doppler frequency signals $R_i(f)$ after the cyclic shift are canceled out, and outputs the signal components U-hat(f−PRF/2) and U-hat(f+PRF/2) which are a composite signal is shown.

However, this configuration is only an example, and, after arranging the received signals (1) and (2) of the reception antennas ch1 and ch2 alternately on the time domain, the signal restoring unit 1 can combine the received signals (1) and (2) of the reception antenna ch1 and ch2, and output a composite signal, as shown in FIG. 5.

Concretely, the signal restoring unit performs the process in the following way.

Because the reception antennas ch1 and ch2 are disposed along the orbital direction of the moving target, assuming that the received signals (1) of the reception antenna ch1 are received at times t1, t3, t5, and . . . , the received signals (2) of the reception antenna ch2 are received at times t2, t4, t6, and . . . , as shown in FIG. 5.

At this time, the signal restoring unit 1 combines the received signals (1) and the received signals (2) in such a way that the received signals (1) and the received signals (2) are arranged alternately on the time domain, as shown in FIG. 5.

By thus combining the received signals (1) and (2) of the reception antennas ch1 and ch2 after arranging the received signals (1) and (2) alternately on the time domain, a composite signal in which the aliasing components associated with the stationary target are canceled out, like in the case of combining the Doppler frequency signals $R_1(f)$ and $R_2(f)$ after the cyclic shift, can be acquired.

Further, although in this Embodiment 1 the example of applying the signal processing device to a radar device that emits pulse signals from a single transmitting antenna is shown, the signal processing device can be applied to a radar device that emits pulse signals from a plurality of transmitting antennas.

Embodiment 2

In the above-mentioned Embodiment 1, the signal processing device that acquires the received signals of the two reception antennas ch1 and ch2 disposed along the orbital direction of a moving target and that detects the moving target is shown.

In contrast with this, in this Embodiment 2, a signal processing device that acquires the received signals of (2K+1) reception antennas (an odd number of reception antennas, the odd number being three or more) disposed along the orbital direction of a platform, and that detects a moving target is explained. In this embodiment, K=1, 2, 3, and . . . .

In this Embodiment 2, because 1/(2K+1)th of the limit of the Doppler frequency shift range in which an aliasing component which is an aliasing noise component does not occur as azimuth ambiguity is used as a pulse repetition frequency PRF, azimuth ambiguity occurs as an aliasing component in a Doppler frequency signal component in each of the received signals of the (2K+1) reception antennas.

Figure 6:
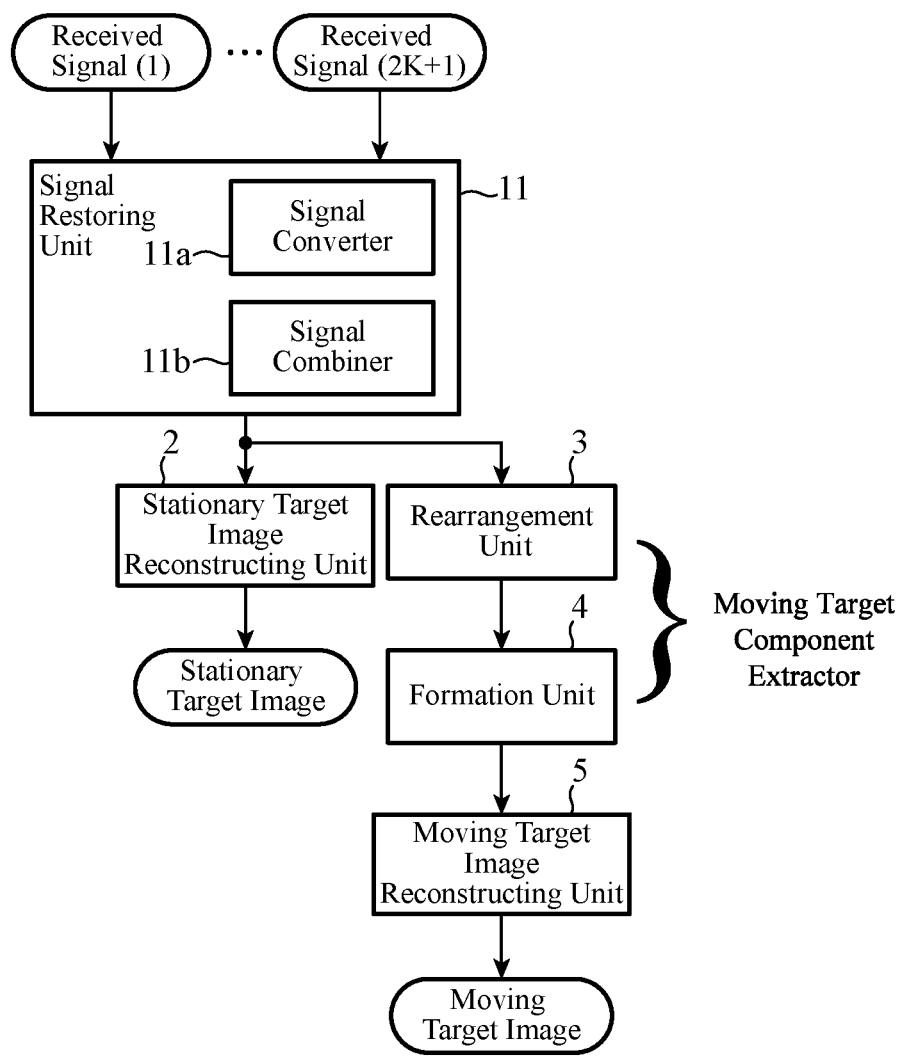
FIG. 6 is a structural diagram showing a signal processing device according to Embodiment 2 of the present invention.
Figure 9:
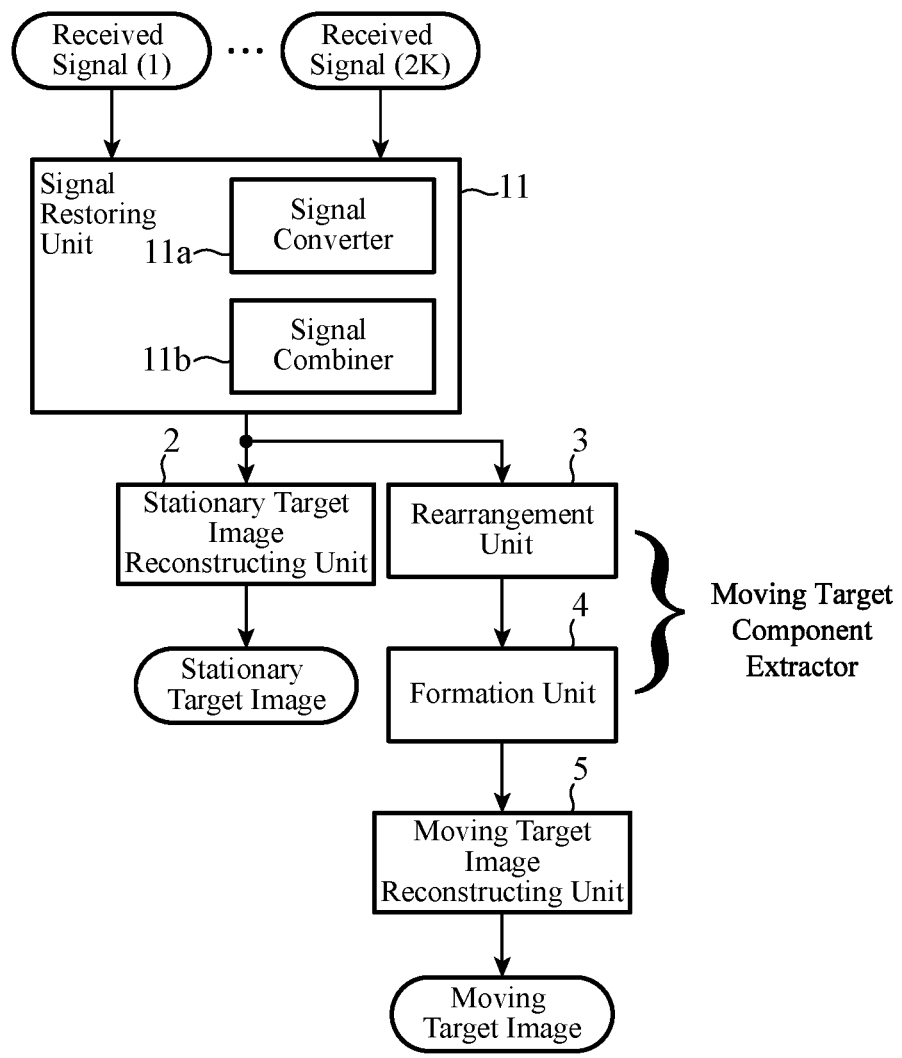
FIG. 9 is a structural diagram showing a signal processing device according to Embodiment 3 of the present invention.

FIG. 6 is a configuration diagram showing the signal processing device according to Embodiment 2 of the present invention. In FIG. 6, because the same reference numerals as those shown in FIG. 1 denote the same components or like components, the explanation of the components will be omitted hereafter.

When receiving the received signals (1) to (2K+1) from the (2K+1) reception antennas disposed along the orbital direction of a moving target, a signal restoring unit 11 performs a process of combining the received signals (1) to (2K+1) in such a way that the aliasing components associated with a stationary target and included in the received signals (1) to (2K+1) are canceled out, and outputting a composite signal.

More specifically, the signal restoring unit 11 includes a signal converter 11a to convert the received signals (1) to (2K+1) which are signals in a time domain into signals in a frequency domain, and to output the signals in the frequency domain as Doppler frequency signals (1) to (2K+1), and a signal combiner 11b to combine the Doppler frequency signals (1) to (2K+1) outputted from the signal converter 11a in such a way that the aliasing components associated with the stationary target and included in the Doppler frequency signals (1) to (2K+1) are canceled out, and to output a composite signal. The signal restoring unit 11 constructs a signal combining means.

Next, operations will be explained.

When the (2K+1) reception antennas receive pulse signals which are included in pulse signals emitted at the pulse repetition frequency PRF from a transmitting antenna and each of which is reflected by a stationary target or a moving target, the signal restoring unit 11 acquires the received signals (1) to (2K+1) of the (2K+1) reception antennas. When acquiring the received signals (1) to (2K+1) of the (2K+1) reception antennas, the signal converter 11a of the signal restoring unit 11 converts the received signals (1) to (2K+1) into signals in the frequency domain, and outputs the signals in the frequency domain as Doppler frequency signals (1) to (2K+1).

As described above, these Doppler frequency signals (1) to (2K+1) are Doppler frequency signals in each of which aliasing occurs, and these Doppler frequency signals are denoted by $\underline{R}_1(f)$ to $\underline{R}_{2K+1}(f)$ hereafter.

It doesn't matter how to convert the received signals (1) to (2K+1) which are signals in the time domain into signals in the frequency domain. For example, by performing a fast Fourier transform process or a discrete Fourier transform process on the received signals (1) to (2K+1), the received signals (1) to (2K+1) can be converted into signals in the frequency domain.

FIG. 7 is an explanatory drawing showing the waveforms of various signals on the frequency domain. In FIG. 7, an example of K=1 is shown.

FIG. 7A shows the Doppler frequency signal $\underline{R}_1(f)$ received by a reception antenna ch1, FIG. 7B shows the Doppler frequency signal $\underline{R}_2(f)$ received by a reception antenna ch2, and FIG. 7C shows the Doppler frequency signal $\underline{R}_3(f)$ received by a reception antenna ch3.

In FIG. 7, a thick line shows a stationary target component and a thin line shows a moving target component. Further, a thick broken line shows an aliasing component associated with the stationary target, and a thin broken line shows an aliasing component associated with the moving target.

When receiving the Doppler frequency signals $\underline{R}_1(f)$ to $\underline{R}_{2K+1}(f)$ from the signal converter 11a, the signal combiner 11b of the signal restoring unit 11 sets the Doppler frequency signals $\underline{R}_1(f)$ to $\underline{R}_{2K+1}(f)$ as $\underline{R}_1(f)$ to $\underline{R}_{2K+1}(f)$, without carrying out such a cyclic shift as that carried out by the signal combiner 1b according to the above-mentioned Embodiment 1.

The signal combiner 11b then performs a process, as shown in the following equation (13), of combining the Doppler frequency signals $\underline{R}_1(f)$ to $\underline{R}_{2K+1}(f)$ in such a way that the aliasing components associated with the stationary target and included in the Doppler frequency signals $\underline{R}_1(f)$ to $\underline{R}_{2K+1}(f)$ are canceled out, and outputs a composite signal as shown in FIG. 7G to a stationary target image reconstructing unit 2 and a rearrangement unit 3.

More specifically, the signal combiner 11b performs the combining process expressed by the equation (13) with a bandwidth of $-PRF/2 \leq f < PRF/2$, thereby acquiring signal components U-hat(f−KPRF) to U-hat(f+KPRF) as the composite signal, and outputs the signal components U-hat(f−KPRF) to U-hat(f+KPRF) to the stationary target image reconstructing unit 2 and the rearrangement unit 3.

$$\begin{bmatrix} \hat{U}(f - KPRF) \\ \vdots \\ \hat{U}(f + KPRF) \end{bmatrix} = \begin{bmatrix} G_1(f - KPRF) & \cdots & G_1(f - KPRF) \\ \vdots & \ddots & \vdots \\ G_{2K+1}(f + KPRF) & \cdots & G_{2K+1}(f + KPRF) \end{bmatrix}^{-1} \begin{bmatrix} R_1(f) \\ \vdots \\ R_{2K+1}(f) \end{bmatrix}$$

$$G_i(f) = \exp\left(-j\pi \frac{f_c \Delta x_i^2}{2cr_0}\right) \exp\left(-j2\pi \frac{\Delta x_i}{2v_{plf}} f\right)$$

(13)

When receiving the signal components U-hat(f−KPRF) to U-hat(f+KPRF) from the signal restoring unit 11, the stationary target image reconstructing unit 2 converts the signal components U-hat(f−KPRF) to U-hat(f+KPRF) into signals in the time domain, and reconstructs an image of the stationary target from the signals in the time domain, like that according to the above-mentioned Embodiment 1.

It doesn't matter how to convert the signal components U-hat(f−KPRF) to U-hat (f+KPRF) into signals in the time domain. For example, by performing an inverse fast Fourier transform process or an inverse discrete Fourier transform process on the signal components U-hat(f−KPRF) to U-hat (f+KPRF), the signal components can be converted into signals in the time domain.

Further, as a method of reconstructing a stationary target image, a range Doppler method, a chirp scaling method, an ω-K method, a polar format method, a back projection method, or the like can be used, like in the case of the above-mentioned Embodiment 1.

When receiving the signal components U-hat(f−KPRF) to U-hat(f+KPRF) from the signal restoring unit 11, the rearrangement unit 3 rearranges the spectra of the signal components U-hat(f−KPRF) to U-hat(f+KPRF) in such a way that the stationary target component and the aliasing component associated with the moving target, the stationary target component and the aliasing component being included in each of the signal components U-hat(f−KPRF) to U-hat(f+KPRF), and the moving target component included in each of the signal components U-hat(f−KPRF) to U-hat(f+KPRF) are separate on the frequency domain, as shown in FIG. 7I.

More specifically, the rearrangement unit 3 rearranges the spectra of the signal components U-hat(f−KPRF) to U-hat(f+KPRF), as shown in the following equation (14).

$$\hat{U}\left(f - \frac{PRF}{4}\right) = \hat{U}\left(f - \left(k + \frac{1}{4}\right)PRF\right) \quad (14)$$

$$\hat{U}\left(f + \frac{PRF}{4}\right) = \hat{U}\left(f + \left(k + \frac{1}{4}\right)PRF\right)$$

$$-\frac{PRF}{4} \leq f < \frac{PRF}{4}$$

The equation (14) shows that the rearrangement of the spectra causes a transition from the state of FIG. 7G to the state of FIG. 7I. In the rearrangement of the spectra, after the spectra of the signal components U-hat(f−KPRF) to U-hat(f+KPRF) are rearranged first in such a way that the stationary target component and the aliasing component associated with the moving target, the stationary target component and the aliasing component being included in each of the signal components U-hat(f−KPRF) to U-hat(f+KPRF), and the moving target component are separate on the frequency domain, as shown in FIG. 7H, the frequency components in each of which a stationary target component remains can be concentrated in a center frequency band, as shown in FIG. 7I.

After the rearrangement unit 3 rearranges the spectra of the signal components U-hat(f−KPRF) to U-hat(f+KPRF), a formation unit 4 suppresses the stationary target component and the aliasing component associated with the moving target, the stationary target component and the aliasing component being included in each of the signal components U-hat(f−KPRF) to U-hat(f+KPRF) after the spectrum rearrangement, and extracts the moving target component included in each of the signal components U-hat(f−KPRF) to U-hat(f+KPRF) after the spectrum rearrangement, as shown in FIG. 7I.

More specifically, the formation unit 4 removes frequency components in each of which a stationary target component remains (in the example of FIG. 7I, frequency components in a center frequency band), from the signal component U-hat(f) having a bandwidth of −PRF/2≤f<PRF/2, thereby extracting the moving target component existing in a band of frequencies lower than the center frequency band and the moving target component existing in a band of frequencies higher than the center frequency band. In the example of FIG. 7J, while the aliasing component associated with the moving target remains, in a small amount, in the band of frequencies lower than the center frequency band and in the band of frequencies higher than the center frequency band, the major component in the lower-frequency band and that in the higher-frequency band are the moving target component.

In this embodiment, the formation unit 4 performs the spectrum arranging process of removing the frequency components in each of which a stationary target component remains from the signal component U-hat(f) having a bandwidth of −PRF/2≤f<PRF/2. As an alternative, the formation unit 4 can average the electric power of the signal component U-hat(f) in a range direction, and whiten the stationary target component by using a weight W-hat(f) which the formation unit acquires by calculating the square root of the averaged result and then calculating the reciprocal of the square root.

Further, because by using the weight W-hat(f) twice, a matched filter can be configured, and the power ratio of signal to stationary target can be maximized, the spectrum arrangement of the signal component U-hat(f) can be carried out by using the matched filter.

Further, when the speed component of the moving target to be observed is predetermined, the moving target component can be extracted from the signal component U-hat(f) by taking into consideration the shift amount corresponding to the Doppler shift.

Further, a filter bank can be configured by combining filters designed for Doppler shifts, and a plurality of signal components each including a moving speed can be outputted. Further, these methods can be combined.

Further, by setting the bandwidth to −PRF/4≤f<PRF/4, the rearrangement unit 3 can arrange the spectra as follows.

$$\hat{U}\left(f - \left(K + \frac{1}{4}\right)PRF\right) = \hat{U}\left(f - \left(k + \frac{1}{4}\right)PRF\right) \quad (14)\text{-}2$$

$$\hat{U}\left(f - \frac{PRF}{4}\right) = -\hat{U}\left(f - \left(k + \frac{1}{4}\right)PRF\right)$$

$$\hat{U}\left(f + \frac{PRF}{4}\right) = \hat{U}\left(f + \left(k + \frac{1}{2}\right)PRF\right)$$

$$\hat{U}\left(f + \left(k + \frac{1}{4}\right)PRF\right) = \hat{U}\left(f + \left(k + \frac{1}{4}\right)PRF\right)$$

It is assumed that zero is provided for any band in which no signal is provided.

By thus adding, in the normal restoring process, a moving target component Doppler-shifted toward a range, outside the band, in which the existing amount of clutter is small, the signal to clutter ratio can be improved. This process is achieved by making a copy of a signal and performing replacement in the rearrangement unit 3. For example, by making a copy of a signal and performing replacement, as mentioned above, the signal to clutter ratio can be further improved.

Also on this signal component, the process of suppressing the stationary target component and the aliasing component associated with the moving target can be performed and the weight $\hat{W}(f)$ described previously can be placed once or twice. Further, also in this spectrum arrangement, when the speed component of the moving target to be observed is predetermined, the signal component can be extracted from $\hat{U}(f)$ by taking into consideration the shift amount corresponding to the Doppler shift. Further, a filter bank can be configured by combining filters designed for Doppler shifts, and a plurality of signal components each including a moving speed can be outputted.

After the formation unit 4 extracts the moving target component, a moving target image reconstructing unit 5 converts the moving target component into a signal in the time domain, and reconstructs an image of the moving target from the signal in the time domain, like that according to the above-mentioned Embodiment 1.

It doesn't matter how to convert the moving target component which is a signal in the frequency domain into a signal in the time domain. For example, by performing an inverse fast Fourier transform process or an inverse discrete Fourier transform process on the moving target component, the moving target component can be converted into a signal in the time domain.

Further, it doesn't matter how to reconstruct a moving target image. For example, a range Doppler method, a chirp scaling method, an ω-K method, a polar format method, a back projection method, or the like can be used.

After reconstructing an image of the moving target, the moving target image reconstructing unit 5 detects one or more pixels each having a larger amplitude value (signal strength) than a preset threshold from among the pixels which construct the image of the moving target, and determines the group of the one or more pixels detected as the moving target, like that according to the above-mentioned Embodiment 1.

This threshold can be determined from, for example, the signal strength associated with the moving target and the signal strength associated with the surroundings of the moving target.

Further, by performing a filtering process of detecting an edge or the like on the pixels which construct the moving target image, using an edge detection filter or a filter equivalent to this edge detection filter, the moving target image reconstructing unit can suppress remaining clutters and azimuth ambiguity. At this time, when an edge detection filter is used for the signal amplitude, the moving target image reconstructing unit cam replace each negative output with 0.

Further, after reconstructing an image of the moving target, the moving target image reconstructing unit 5 can apply different colors to the image of the moving target and the image of the stationary target reconstructed by the stationary target image reconstructing unit 2, to adjust the dynamic range, and, after that, superimpose the image of the moving target and the image of the stationary target on each other, like that according to the above-mentioned Embodiment 1.

By thus superimposing the image of the moving target and the image of the stationary target on each other, visual recognition of the images superimposed on each other can be carried out.

The process of reconstructing the image of the moving target, which is performed by the moving target image reconstructing unit 5, and the process of reconstructing the image of the stationary target, which is performed by the stationary target image reconstructing unit 2, can be performed in parallel.

As can be seen from the above description, even if the number of reception antennas is odd and is three or more, this Embodiment 2 provides an advantage of being able to achieve high resolution and a wide observation width and to also detect a moving target, like the above-mentioned Embodiment 1.

In this Embodiment 2, the example in which the rearrangement unit 3 rearranges the spectra of the signal components $\underline{U}$-hat(f−KPRF) to $\underline{U}$-hat(f+KPRF) in such a way that the stationary target component and the aliasing component associated with the moving target, and the moving target component are separate on the frequency domain, and the formation unit 4 suppresses the stationary target component and the aliasing component associated with the moving target, the stationary target component and the aliasing component being included in each of the signal components $\underline{U}$-hat(f−KPRF) to $\underline{U}$-hat(f+KPRF) after the spectrum rearrangement, and extracts the moving target component included in each of the signal components $\underline{U}$-hat(f−KPRF) to $\underline{U}$-hat(f+KPRF) after the spectrum rearrangement is shown.

However, this configuration is only an example, and the stationary target component and the aliasing component associated with the moving target can be suppressed and the moving target component can be extracted without rearranging the spectra.

Concretely, the moving target image reconstructing unit 5 performs a range cell migration process and a matched filter process for azimuth compression on the signal components U-hat(f−KPRF) to U-hat(f+KPRF) outputted from the signal restoring unit 1 in such a way that the stationary target component and the moving target component which are included in each of the signal components U-hat(f−KPRF) to U-hat(f+KPRF) are suppressed, and the aliasing component of the moving target component is imaged as a desired signal, thereby extracting the moving target component included in each of the signal components U-hat(f−KPRF) to U-hat(f+KPRF). Because the range cell migration process and the matched filter process for azimuth compression are known techniques, a detailed explanation of the processes will be omitted hereafter.

In this Embodiment 2, the example in which the signal converter 11a of the signal restoring unit 11 converts the received signals (1) to (2K+1) of the (2K+1) reception antennas into signals in the frequency domain, and the signal combiner 11b combines the Doppler frequency signals $\underline{R}_1(f)$ to $\underline{R}_{2K+1}(f)$ which are the signals in the frequency domain in such a way that the aliasing components associated with the stationary target and included in the Doppler frequency signals $\underline{R}_1(f)$ to $\underline{R}_{2K+1}(f)$ are canceled out, and outputs the signal components U-hat(f−KPRF) to U-hat(f+KPRF) which are a composite signal is shown.

However, this configuration is only an example, and, after arranging the received signals (1) to (2K+1) of the (2K+1) reception antennas in proper order on the time domain, the signal restoring unit 11 can combine the received signals (1) to (2K+1) of the reception antennas and output a composite signal, as shown in FIG. 8.

Further, although in this Embodiment 2 the example of applying the signal processing device to a radar device that emits pulse signals from a single transmitting antenna is shown, the signal processing device can be applied to a radar device that emits pulse signals from a plurality of transmitting antennas.

Embodiment 3

In the above-mentioned Embodiment 1, the signal processing device that acquires the received signals of the two reception antennas ch1 and ch2 disposed along the orbital direction of a moving target and that detects the moving target is shown. In contrast with this, in this Embodiment 3, a signal processing device that acquires the received signals of 2K reception antennas (an even number of reception antennas, the even number being two or more) disposed along the orbital direction of a platform, and that detects a moving target is explained.

In this embodiment, K=1, 2, 3, and . . . .

In this Embodiment 3, because ½Kth of the limit of the Doppler frequency shift range in which an aliasing component which is an aliasing noise component does not occur as azimuth ambiguity is used as a pulse repetition frequency PRF, azimuth ambiguity occurs as an aliasing component in a Doppler frequency signal component in each of the received signals of the 2K reception antennas.

Next, operations will be explained.

When the 2K reception antennas receive pulse signals which are included in pulse signals emitted at the pulse repetition frequency PRF from a transmitting antenna and each of which is reflected by a stationary target or a moving target, a signal restoring unit 11 acquires the received signals (1) to (2K) of the 2K reception antennas.

When acquiring the received signals (1) to (2K) of the 2K reception antennas, a signal converter 11a of the signal restoring unit 11 converts the received signals (1) to (2K) into signals in a frequency domain, and outputs the signals in the frequency domain as Doppler frequency signals (1) to (2K).

As described above, these Doppler frequency signals (1) to (2K) are Doppler frequency signals in each of which aliasing occurs, and these Doppler frequency signals are denoted by $\underline{R}_1(f)$ to $\underline{R}_{2K}(f)$ hereafter.

It doesn't matter how to convert the received signals (1) to (2K) which are signals in a time domain into signals in the frequency domain. For example, by performing a fast Fourier transform process or a discrete Fourier transform process on the received signals (1) to (2K), the received signals (1) to (2K) can be converted into signals in the frequency domain.

When receiving the Doppler frequency signals $\underline{R}_1(f)$ to $\underline{R}_{2K}(f)$ from the signal converter 11a, a signal combiner 11b of the signal restoring unit 11 sets the Doppler frequency signals $\underline{R}_1(f)$ to $\underline{R}_{2K}(f)$ as $\underline{R}_1(f)$ to $\underline{R}_{2K}(f)$, without carrying out such a cyclic shift as that carried out by the signal combiner 1b according to the above-mentioned Embodiment 1.

The signal combiner 11b then performs a process, as shown in the following equation (15), of combining the Doppler frequency signals $\underline{R}_1(f)$ to $\underline{R}_{2K}(f)$ in such a way that the aliasing components associated with the stationary target and included in the Doppler frequency signals $\underline{R}_1(f)$ to $\underline{R}_{2K}(f)$ are canceled out, and outputs a composite signal as shown in FIG. 4E to a stationary target image reconstructing unit 2 and a rearrangement unit 3. In FIG. 4, an example of K=1 is shown.

More specifically, the signal combiner 11b performs the combining process expressed by the equation (15) with a bandwidth of $-PRF/2 \leq f < PRF/2$, thereby acquiring signal components U-hat(f−(K−½)PRF) to U-hat(f+(K−½)PRF) as the composite signal, and outputs the signal components U-hat(f−(K−½)PRF) to U-hat(f+(K−½)PRF) to the stationary target image reconstructing unit 2 and the rearrangement unit 3.

$$\begin{bmatrix} \hat{U}\left(f-\left(K-\frac{1}{2}\right)PRF\right) \\ \vdots \\ \hat{U}\left(f+\left(K-\frac{1}{2}\right)PRF\right) \end{bmatrix} = \quad (15)$$

$$\begin{bmatrix} G_1\left(f-\left(K-\frac{1}{2}\right)PRF\right) & \cdots & G_1\left(f-\left(K-\frac{1}{2}\right)PRF\right) \\ \vdots & \ddots & \vdots \\ G_{2K}\left(f+\left(K-\frac{1}{2}\right)PRF\right) & \cdots & G_{2K}\left(f+\left(K-\frac{1}{2}\right)PRF\right) \end{bmatrix}^{-1}$$

$$\begin{bmatrix} R_1(f) \\ \vdots \\ R_{2K}(f) \end{bmatrix}$$

$$G_i(f) = \exp\left(-j\pi \frac{f_c \Delta x_i^2}{2cr_0}\right)\exp\left(-j2\pi \frac{\Delta x_i}{2v_{ptf}}f\right)$$

When receiving the signal components U-hat (f−(K−½) PRF) to U-hat(f+(K−½)PRF) from the signal restoring unit 11, the stationary target image reconstructing unit 2 converts the signal components U-hat(f−(K−½) PRF) to U-hat (f+(K−½) PRF) into signals in the time domain, and reconstructs an image of the stationary target from the signals in the time domain, like that according to the above-mentioned Embodiment 1.

It doesn't matter how to convert the signal components U-hat(f−(K−½)PRF) to U-hat(f+(K−½)PRF) into signals in the time domain. For example, by performing an inverse fast Fourier transform process or an inverse discrete Fourier transform process on the signal components U-hat(f−(K−½)PRF) to U-hat(f+(K−½)PRF), the signal components can be converted into signals in the time domain.

Further, as a method of reconstructing a stationary target image, a range Doppler method, a chirp scaling method, an ω-K method, a polar format method, a back projection method, or the like can be used, like in the case of the above-mentioned Embodiment 1.

When receiving the signal components U-hat(f−(K−½) PRF) to U-hat(f+(K−½)PRF) from the signal restoring unit 11, the rearrangement unit 3 rearranges the spectra of the signal components U-hat(f−(K−½)PRF) to U-hat(f+(K−½) PRF) in such a way that the stationary target component and the aliasing component associated with the moving target, the stationary target component and the aliasing component being included in each of the signal components U-hat(f−(K−½)PRF) to U-hat (f+(K−½) PRF), and the moving target component included in each of the signal components U-hat (f−(K−½)PRF) to U-hat(f+(K−½)PRF) are separate on the frequency domain, as shown in FIG. 4F.

More specifically, the rearrangement unit 3 rearranges the spectra of the signal components U-hat(f−(K−½)PRF) to U-hat(f+(K−½)PRF), as shown in the following equation (16).

$$\hat{U}\left(f - \frac{PRF}{2}\right) = -\hat{U}\left(f + \left(K - \frac{1}{2}\right)PRF\right) \quad (16)$$

$$\hat{U}\left(f + \frac{PRF}{2}\right) = -\hat{U}\left(f - \left(K - \frac{1}{2}\right)PRF\right)$$

$$-\frac{PRF}{2} \leq f < \frac{PRF}{2}$$

After the rearrangement unit 3 rearranges the spectra of the signal components U-hat(f−(K−½)PRF) to U-hat(f+(K−½)PRF), a formation unit 4 suppresses the stationary target component and the aliasing component associated with the moving target, the stationary target component and the aliasing component being included in each of the signal components U-hat(f−(K−½)PRF) to U-hat(f+(K−½)PRF) after the spectrum rearrangement, and extracts the moving target component included in each of the signal components U-hat(f−(K−½)PRF) to U-hat(f+(K−½)PRF) after the spectrum rearrangement, as shown in FIG. 4G.

More specifically, the formation unit 4 removes frequency components in each of which a stationary target component remains (in the example of FIG. 4F, low-frequency and high-frequency components except frequency components in a center frequency band), from the signal component U-hat(f) having a bandwidth of −PRF/2≤f<PRF/2, thereby extracting the moving target component existing in the center frequency band. In the example of FIG. 4F, while the aliasing component associated with the moving target remains, in a small amount, in the center frequency band, the major component in the center frequency band is the moving target component.

In this embodiment, the formation unit 4 performs the spectrum arranging process of removing the frequency components in each of which a stationary target component remains from the signal component U-hat (f) having a bandwidth of −PRF/2≤f<PRF/2.

As an alternative, the formation unit 4 can average the electric power of the signal component U-hat(f) in a range direction, and whiten the stationary target component by using a weight W-hat(f) which the formation unit acquires by calculating the square root of the averaged result and then calculating the reciprocal of the square root.

Further, because by using the weight W-hat(f) twice, a matched filter can be configured, and the power ratio of signal to stationary target can be maximized, the spectrum arrangement of the signal component U-hat(f) can be carried out by using the matched filter.

Further, when the speed component of the moving target to be observed is predetermined, the moving target component can be extracted from the signal component U-hat(f) by taking into consideration the shift amount corresponding to the Doppler shift.

Further, a filter bank can be configured by combining filters designed for Doppler shifts, and a plurality of signal components each including a moving speed can be outputted. Further, these methods can be combined.

Further, by setting the bandwidth to −PRF/2≤f<PRF/2, the rearrangement unit 3 can arrange the spectra as follows.

$$\hat{U}\left(f-\left(K-\frac{1}{2}\right)PRF\right) = \hat{U}\left(f-\left(K-\frac{1}{2}\right)PRF\right) \quad (16)\text{-}2$$

$$\hat{U}\left(f-\frac{PRF}{2}\right) = -\hat{U}\left(f+\left(K-\frac{1}{2}\right)PRF\right)$$

$$\hat{U}\left(f+\frac{PRF}{2}\right) = \hat{U}\left(f-\left(K-\frac{1}{2}\right)PRF\right)$$

$$\hat{U} = \left(f+\left(K-\frac{1}{2}\right)PRF\right) = \hat{U}\left(f+\left(K-\frac{1}{2}\right)PRF\right)$$

It is assumed that zero is provided for any band in which no signal is provided.

By thus adding, in the normal restoring process, a moving target component Doppler-shifted toward a range, outside the band, in which the existing amount of clutter is small, the signal to clutter ratio can be improved. This process is achieved by making a copy of a signal and performing replacement in the rearrangement unit. For example, by making a copy of a signal and performing replacement, as mentioned above, the signal to clutter ratio can be further improved.

Also on this signal component, the process of suppressing the stationary target component and the aliasing component associated with the moving target can be performed and the weight $\hat{W}(f)$ described previously can be placed once or twice. Further, also in this spectrum arrangement, when the speed component of the moving target to be observed is predetermined, the signal component can be extracted from $\hat{U}(f)$ by taking into consideration the shift amount corresponding to the Doppler shift. Further, a filter bank can be configured by combining filters designed for Doppler shifts, and a plurality of signal components each including a moving speed can be outputted.

After the formation unit 4 extracts the moving target component, a moving target image reconstructing unit 5 converts the moving target component into a signal in the time domain, and reconstructs an image of the moving target from the signal in the time domain, like that according to the above-mentioned Embodiment 1.

It doesn't matter how to convert the moving target component which is a signal in the frequency domain into a signal in the time domain. For example, by performing an inverse fast Fourier transform process or an inverse discrete Fourier transform process on the moving target component, the moving target component can be converted into a signal in the time domain.

Further, it doesn't matter how to reconstruct a moving target image. For example, a range Doppler method, a chirp scaling method, an ω-K method, a polar format method, a back projection method, or the like can be used.

After reconstructing an image of the moving target, the moving target image reconstructing unit 5 detects one or more pixels each having a larger amplitude value (signal strength) than a preset threshold from among the pixels which construct the image of the moving target, and determines the group of the one or more pixels detected as the moving target, like that according to the above-mentioned Embodiment 1.

This threshold can be determined from, for example, the signal strength associated with the moving target and the signal strength associated with the surroundings of the moving target.

Further, by performing a filtering process of detecting an edge or the like on the pixels which construct the moving target image, using an edge detection filter or a filter equivalent to this edge detection filter, the moving target image reconstructing unit can suppress remaining clutters and azimuth ambiguity. At this time, when an edge detection filter is used for the signal amplitude, the moving target image reconstructing unit cam replace each negative output with 0.

Further, after reconstructing an image of the moving target, the moving target image reconstructing unit 5 can apply different colors to the image of the moving target and the image of the stationary target reconstructed by the stationary target image reconstructing unit 2, to adjust the dynamic range, and, after that, superimpose the image of the moving target and the image of the stationary target on each other, like that according to the above-mentioned Embodiment 1.

By thus superimposing the image of the moving target and the image of the stationary target on each other, visual recognition of the images superimposed on each other can be carried out.

The process of reconstructing the image of the moving target, which is performed by the moving target image reconstructing unit 5, and the process of reconstructing the image of the stationary target, which is performed by the stationary target image reconstructing unit 2, can be performed in parallel.

As can be seen from the above description, even if the number of reception antennas is even and is two or more, this Embodiment 3 provides an advantage of being able to achieve high resolution and a wide observation width and to also detect a moving target, like the above-mentioned Embodiment 1.

In this Embodiment 2, the example in which the rearrangement unit 3 rearranges the spectra of the signal components U-hat(f−(K−½)PRF) to U-hat (f+(K−½) PRF) in such a way that the stationary target component and the aliasing component associated with the moving target, and the moving target component are separate on the frequency domain, and the formation unit 4 extracts the moving target component included in each of the signal components U-hat(f−(K−½)PRF) to U-hat(f+(K−½)PRF) after the spectrum rearrangement is shown.

However, this configuration is only an example, and the stationary target component and the aliasing component associated with the moving target can be suppressed and the moving target component can be extracted without rearranging the spectra.

Concretely, the moving target image reconstructing unit 5 performs a range cell migration process and a matched filter process for azimuth compression on the signal components U-hat(f−(K−½) PRF) to U-hat(f+(K−½) PRF) outputted from the signal restoring unit 1 in such a way that the stationary target component and the moving target component which are included in each of the signal components U-hat(f−(K−½)PRF) to U-hat(f+(K−½) PRF) are suppressed, and the aliasing component of the moving target component is imaged as a desired signal, thereby extracting the moving target component included in each of the signal components U-hat(f−(K−½)PRF) to U-hat(f+(K−½)PRF). Because the range cell migration process and the matched filter process for azimuth compression are known techniques, a detailed explanation of the processes will be omitted hereafter.

In this Embodiment 3, the example in which the signal converter 11a of the signal restoring unit 11 converts the received signals (1) to (2K) of the 2K reception antennas into signals in the frequency domain, and the signal combiner 11b combines the Doppler frequency signals $\underline{R}_1(f)$ to $\underline{R}_{2K}(f)$ which are the signals in the frequency domain in such a way that the aliasing components associated with the stationary target and included in the Doppler frequency signals $\underline{R}_1(f)$ to $\underline{R}_{2K}(f)$ are canceled out, and outputs the signal components U-hat(f−(K−½)PRF) to U-hat(f+(K−½) PRF) which are a composite signal is shown.

Figure 10:
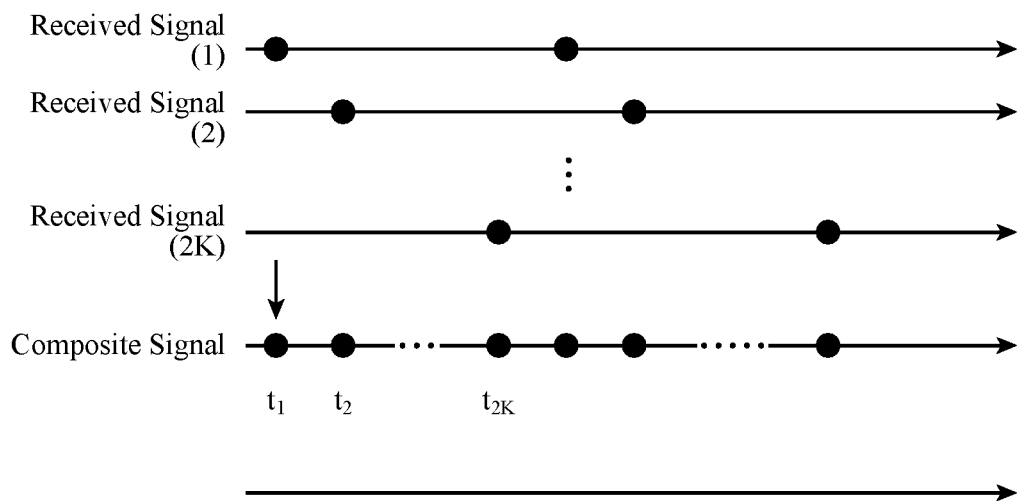
FIG. 10 is an explanatory drawing showing combining of received signals (1) to (2K) on a time domain.

However, this configuration is only an example, and, after arranging the received signals (1) to (2K) of the 2K reception antennas in proper order on the time domain, the signal restoring unit 11 can combine the received signals (1) to (2K) of the reception antennas and output a composite signal, as shown in FIG. 10.

Further, although in this Embodiment 3 the example of applying the signal processing device to a radar device that emits pulse signals from a single transmitting antenna is shown, the signal processing device can be applied to a radar device that emits pulse signals from a plurality of transmitting antennas.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The signal processing device according to the present invention is suitable for devices that need to detect a moving target while achieving high resolution and a wide observation width without increasing the number of channels.

REFERENCE SIGNS LIST

1: signal restoring unit (signal synthesis means), 1a: signal converter, 1b: signal combiner, 2: stationary target image reconstructing unit (image reconstructing means), 3: rearrangement unit (moving target component extracting means), 4: formation unit (moving target component extracting means), 5: moving target image reconstructing unit, 11: signal restoring unit (signal combining means), 11a: signal converter, and 11b: signal combiner.

The invention claimed is:

1. A signal processing device comprising:
a signal combiner to, when a plurality of reception antennas, the reception antennas being disposed along an orbital direction of a platform in which a radar device is mounted, receive signals which are included in signals repeatedly transmitted from a transmitting antenna and which are reflected by a stationary target and a moving target, combine the received signals of said plurality of reception antennas in such a way that aliasing noise components associated with said stationary target and included in the received signals of said plurality of reception antennas are canceled out, and output a composite signal;
a moving target component extractor to suppress a stationary target component and an aliasing noise component associated with said moving target, the stationary target component and the aliasing noise component associated with said moving target being included in the composite signal outputted from said signal combiner, and extracting a moving target component included in said composite signal; and
an image reconstructing unit to reconstruct an image of said moving target from the moving target component extracted by said moving target component extractor, wherein:
said signal combiner converts the received signals of said plurality of reception antennas into a plurality of signals in a frequency domain, combines said plurality of signals in the frequency domain in such a way that aliasing noise components associated with said stationary target and included in said plurality of signals in the frequency domain are canceled out, thereby to output the composite signal,
said moving target component extractor includes:
a rearrangement unit to rearrange a spectrum of said composite signal in such a way that the stationary target component and the aliasing noise component associated with said moving target, the stationary target component and the aliasing noise component associated with said moving target being included in the composite signal outputted from said signal combiner, and the moving target component included in said composite signal, are separate on the frequency domain, and a formation unit to suppress the stationary target component and the aliasing noise component associated with said moving target, the stationary target component and the aliasing noise component associated with said moving target being included in the composite signal whose spectrum is rearranged by said rearrangement unit, and to extract the moving target component included in said composite signal, and said signal combiner cyclically shifts said plurality of signals in the frequency domain by one-half of a pulse repetition frequency of the signals transmitted from said transmitting antenna, combines said plurality of signals in the frequency domain after the cyclic shift in such a way that the aliasing noise components associated with said stationary target and included in said plurality of signals in the frequency domain after the cyclic shift are canceled out, and outputs the composite signal.

2. The signal processing device according to claim 1, wherein when rearranging the spectrum of said composite signal, said rearrangement unit makes a copy of a signal which is a part included in said composite signal.

3. The signal processing device according to claim 1, wherein said image reconstructing unit detects pixels having a larger amplitude value than a preset threshold from among pixels which construct the image of said moving target, thereby detecting said moving target.

4. The signal processing device according to claim 1, wherein said image reconstructing unit performs a filtering process of detecting an edge on pixels which construct the image of said moving target.

5. The signal processing device according to claim 1, wherein said image reconstructing unit reconstructs an image of said stationary target from the stationary target component included in the composite signal outputted from said signal combiner.

6. The signal processing device according to claim 5, wherein said image reconstructing unit applies different colors to the image of said moving target and the image of said stationary target, and, thereafter, superimposes the image of said moving target and the image of said stationary target on each other.

7. A signal processing device comprising:

a signal combiner to, when a plurality of reception antennas, the reception antennas being disposed along an orbital direction of a platform in which a radar device is mounted, receive signals which are included in signals repeatedly transmitted from a transmitting antenna and which are reflected by a stationary target and a moving target, combine the received signals of said plurality of reception antennas in such a way that aliasing noise components associated with said stationary target and included in the received signals of said plurality of reception antennas are canceled out, and to output a composite signal;

a moving target component extractor to suppress a stationary target component and an aliasing noise component associated with said moving target, the stationary target component and the aliasing noise component associated with said moving target being included in the composite signal outputted from said signal combiner, and extracting a moving target component included in said composite signal; and an image reconstructing unit to reconstruct an image of said moving target from the moving target component extracted by said moving target component extractor, wherein:

said signal combiner arranges the received signals of said plurality of reception antennas alternately on a time domain, and, thereafter, combines the received signals of said plurality of reception antennas thereby to output the composite signal, said moving target component extractor includes:

a rearrangement unit to rearrange a spectrum of said composite signal in such a way that the stationary target component and the aliasing noise component associated with said moving target, the stationary target component and the aliasing noise component associated with said moving target being included in the composite signal outputted from said signal combiner, and the moving target component included in said composite signal, are separate on a frequency domain, and a formation unit to suppress the stationary target component and the aliasing noise component associated with said moving target, the stationary target component and the aliasing noise component associated with said moving target being included in the composite signal whose spectrum is rearranged by said rearrangement unit, and extracting the moving target component included in said composite signal, and said signal combiner cyclically shifts said received signals in the frequency domain by one-half of a pulse repetition frequency of the signals transmitted from said transmitting antenna, combines said received signals in the frequency domain after the cyclic shift in such a way that the aliasing noise components associated with said stationary target and included in said received signals in the frequency domain after the cyclic shift are canceled out, and outputs the composite signal.

8. The signal processing device according to claim 7, wherein when rearranging the spectrum of said composite signal, said rearrangement unit makes a copy of a signal which is a part included in said composite signal.

9. The signal processing device according to claim 7, wherein said image reconstructing unit detects pixels having a larger amplitude value than a preset threshold from among pixels which construct the image of said moving target, thereby detecting said moving target.

10. The signal processing device according to claim 7, wherein said image reconstructing unit performs a filtering process of detecting an edge on pixels which construct the image of said moving target.

11. The signal processing device according to claim 7, wherein said image reconstructing unit reconstructs an image of said stationary target from the stationary target component included in the composite signal outputted from said signal combiner.

12. The signal processing device according to claim 11, wherein said image reconstructing unit applies different colors to the image of said moving target and the image of said stationary target, and, thereafter, superimposes the image of said moving target and the image of said stationary target on each other.

13. A signal processing device comprising:
circuitry configured to
  when a plurality of reception antennas, the reception antennas being disposed along an orbital direction of a platform in which a radar device is mounted, receive signals which are included in signals repeatedly transmitted from a transmitting antenna and which are reflected by a stationary target and a moving target,
    convert the received signals of the plurality of reception antennas into a plurality of signals in a frequency domain,
    combine the plurality of signals in the frequency domain in such a way that aliasing noise components associated with the stationary target and included in the plurality of signals in the frequency domain are canceled out, and
    output a composite signal,
  rearrange a spectrum of the composite signal in such a way that a stationary target component and an aliasing noise component associated with the moving target, the stationary target component and the aliasing noise component associated with the moving target being included in the composite signal outputted, and a moving target component included in the composite signal, are separate on the frequency domain,
  suppress the stationary target component and the aliasing noise component associated with the moving target, the stationary target component and the aliasing noise component associated with the moving target being included in the composite signal whose spectrum is rearranged,
  extract the moving target component included in the composite signal, and
  reconstruct an image of the moving target from the moving target component extracted, wherein
the circuitry is configured to
  cyclically shift the plurality of signals in the frequency domain by one-half of a pulse repetition frequency of the signals transmitted from said transmitting antenna,
  combine the plurality of signals in the frequency domain after the cyclic shift in such a way that the aliasing noise components associated with the stationary target and included in the plurality of signals in the frequency domain after the cyclic shift are canceled out, and
  output the composite signal.

14. The signal processing device according to claim 13, wherein when rearranging the spectrum of the composite signal, the circuitry is configured to make a copy of a signal which is a part included in the composite signal.

15. The signal processing device according to claim 13, wherein the circuitry is configured to perform a filtering process of detecting an edge on pixels which construct the image of the moving target.

16. The signal processing device according to claim 13, wherein the circuitry is configured to reconstruct an image of the stationary target from the stationary target component included in the composite signal outputted.

17. The signal processing device according to claim 13, wherein the circuitry is configured to detect pixels having a larger amplitude value than a preset threshold from among pixels which construct the image of the moving target, thereby detecting the moving target.

* * * * *